(12) United States Patent
Dal Mutto

(10) Patent No.: US 9,619,105 B1
(45) Date of Patent: Apr. 11, 2017

(54) SYSTEMS AND METHODS FOR GESTURE BASED INTERACTION WITH VIEWPOINT DEPENDENT USER INTERFACES

(71) Applicant: Aquifi, Inc., Palo Alto, CA (US)

(72) Inventor: Carlo Dal Mutto, Sunnyvale, CA (US)

(73) Assignee: Aquifi, Inc., Palo Alto, CA (US)

( * ) Notice: Subject to any disclaimer, the term of this patent is extended or adjusted under 35 U.S.C. 154(b) by 35 days.

(21) Appl. No.: 14/169,124

(22) Filed: Jan. 30, 2014

(51) Int. Cl.
| G06F 3/0346 | (2013.01) |
| G06F 3/0481 | (2013.01) |
| G06F 3/01 | (2006.01) |
| G06F 3/03 | (2006.01) |

(52) U.S. Cl.
CPC .......... *G06F 3/04815* (2013.01); *G06F 3/011* (2013.01); *G06F 3/012* (2013.01); *G06F 3/017* (2013.01); *G06F 3/0304* (2013.01); *G06F 3/0346* (2013.01)

(58) Field of Classification Search
CPC ....... G06F 3/0346; G06F 3/0304; G06F 3/038
IPC .................................................... G06F 3/0346
See application file for complete search history.

(56) References Cited

U.S. PATENT DOCUMENTS

| 5,454,043 | A | 9/1995 | Freeman et al. |
| 5,852,672 | A | 12/1998 | Lu |
| 6,191,773 | B1 | 2/2001 | Maruno et al. |
| 6,323,942 | B1 | 11/2001 | Bamji |
| 6,512,838 | B1 | 1/2003 | Rafii et al. |
| 6,515,740 | B2 | 2/2003 | Bamji et al. |
| 6,522,395 | B1 | 2/2003 | Bamji et al. |
| 6,580,496 | B2 | 6/2003 | Bamji et al. |
| 6,587,186 | B2 | 7/2003 | Bamji et al. |

(Continued)

FOREIGN PATENT DOCUMENTS

| WO | 9749262 A1 | 12/1997 |
| WO | 2005091125 A2 | 9/2005 |

(Continued)

OTHER PUBLICATIONS

International Search Report and Written Opinion for International Application PCT/US2014/012748, report completed Nov. 30, 2014, Mailed Jan. 14, 2015, 17 Pgs.

(Continued)

*Primary Examiner* — Carolyn R Edwards
*Assistant Examiner* — Mansour M Said
(74) *Attorney, Agent, or Firm* — Lewis Roca Rothgerber Christie LLP

(57) ABSTRACT

Systems and methods are disclosed for performing three-dimensional (3D) gesture based interaction with a user interface rendered from a 3D object model based upon the viewpoint of a user. Gesture based interactive systems in accordance with many embodiments of the invention utilize a spatial model of how user interface objects, such as icons and a cursor, spatially relate to one another. The user interface model can be constructed as a 3D object model. With a 3D object model, the operating system can use depth information to render a user interface display appropriate to the requirements of a specific display technology. In many embodiments, head tracking is used to determine a viewpoint from which to render a user interface display from a 3D object model maintained by the operating system and the user interface can be updated in response to the detection of 3D gestures.

19 Claims, 11 Drawing Sheets

(56) References Cited

U.S. PATENT DOCUMENTS

| | | |
|---|---|---|
| 6,614,422 B1 | 9/2003 | Rafii et al. |
| 6,674,895 B2 | 1/2004 | Rafii et al. |
| 6,678,039 B2 | 1/2004 | Charbon |
| 6,690,354 B2 | 2/2004 | Sze |
| 6,690,618 B2 | 2/2004 | Tomasi et al. |
| 6,710,770 B2 | 3/2004 | Tomasi et al. |
| 6,834,120 B1 | 12/2004 | LeClerc et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 6,944,315 B1 | 9/2005 | Zipperer et al. |
| 7,006,236 B2 | 2/2006 | Tomasi et al. |
| 7,038,659 B2 | 5/2006 | Rajkowski |
| 7,050,177 B2 | 5/2006 | Tomasi et al. |
| 7,151,530 B2 | 12/2006 | Roeber et al. |
| 7,157,685 B2 | 1/2007 | Bamji et al. |
| 7,173,230 B2 | 2/2007 | Charbon |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,433,029 B1 | 10/2008 | Hsu |
| 7,450,220 B2 | 11/2008 | O'Connor et al. |
| 7,464,351 B2 | 12/2008 | Bamji et al. |
| 7,471,376 B2 | 12/2008 | Bamji et al. |
| 7,507,947 B2 | 3/2009 | Bamji et al. |
| 7,511,801 B1 | 3/2009 | Rafii et al. |
| 7,526,120 B2 | 4/2009 | Gokturk et al. |
| 7,636,150 B1 | 12/2009 | McCauley et al. |
| 7,653,833 B1 | 1/2010 | Miller et al. |
| 7,653,883 B2 | 1/2010 | Hotelling et al. |
| 7,665,041 B2 | 2/2010 | Wilson et al. |
| 7,719,662 B2 | 5/2010 | Bamji et al. |
| 7,741,961 B1 | 6/2010 | Rafii et al. |
| 7,791,715 B1 | 9/2010 | Bamji |
| 7,805,003 B1 | 9/2010 | Cohen et al. |
| 7,877,707 B2 | 1/2011 | Westerman et al. |
| 7,936,449 B1 | 5/2011 | Bamji et al. |
| 7,994,465 B1 | 8/2011 | Bamji et al. |
| 8,009,871 B2 | 8/2011 | Rafii et al. |
| D645,493 S | 9/2011 | Zhao |
| 8,086,971 B2 | 12/2011 | Radivojevic et al. |
| 8,134,637 B2 | 3/2012 | Rossbach |
| 8,139,141 B2 | 3/2012 | Bamji et al. |
| 8,139,142 B2 | 3/2012 | Bamji et al. |
| 8,179,604 B1 | 5/2012 | Prada Gomez et al. |
| 8,180,114 B2 | 5/2012 | Nishihara et al. |
| 8,194,233 B2 | 6/2012 | Bamji |
| 8,203,699 B2 | 6/2012 | Bamji et al. |
| 8,212,859 B2 | 7/2012 | Tang et al. |
| 8,232,990 B2 | 7/2012 | King et al. |
| 8,265,350 B2 | 9/2012 | Torii et al. |
| 8,274,535 B2 | 9/2012 | Hildreth et al. |
| 8,314,924 B2 | 11/2012 | Bamji et al. |
| 8,339,359 B2 | 12/2012 | Hsieh et al. |
| 8,363,212 B2 | 1/2013 | Bamji et al. |
| 8,368,795 B2 | 2/2013 | Lo et al. |
| 8,462,132 B2 | 6/2013 | Ren et al. |
| 8,525,876 B2 | 9/2013 | Fan et al. |
| 8,539,359 B2 | 9/2013 | Rapaport et al. |
| 8,587,773 B2 | 11/2013 | Bamji et al. |
| 8,589,033 B2 | 11/2013 | Rafii et al. |
| 8,615,108 B1 | 12/2013 | Stoppa et al. |
| 8,655,021 B2 | 2/2014 | Dal Mutto et al. |
| 8,675,182 B2 | 3/2014 | Bamji |
| 8,681,124 B2 | 3/2014 | Bamji et al. |
| 8,686,943 B1 | 4/2014 | Rafii |
| 8,693,724 B2 | 4/2014 | Ahmed et al. |
| 8,787,663 B2 | 7/2014 | Litvak et al. |
| 8,824,737 B2 | 9/2014 | Gurman et al. |
| 8,830,312 B2 | 9/2014 | Hummel et al. |
| 8,836,768 B1 | 9/2014 | Rafii et al. |
| 8,840,466 B2 | 9/2014 | Kareemi et al. |
| 8,934,675 B2 | 1/2015 | Dal Mutto et al. |
| 2002/0112095 A1 | 8/2002 | Ford et al. |
| 2002/0140633 A1 | 10/2002 | Rafii et al. |
| 2003/0021032 A1 | 1/2003 | Bamji et al. |
| 2003/0132921 A1 | 7/2003 | Torunoglu et al. |
| 2003/0132950 A1 | 7/2003 | Surucu et al. |
| 2003/0165048 A1 | 9/2003 | Bamji et al. |
| 2003/0169906 A1 | 9/2003 | Gokturk et al. |
| 2003/0174125 A1 | 9/2003 | Torunoglu et al. |
| 2004/0046744 A1 | 3/2004 | Rafii et al. |
| 2004/0066500 A1 | 4/2004 | Gokturk et al. |
| 2004/0170323 A1 | 9/2004 | Cootes et al. |
| 2005/0134853 A1 | 6/2005 | Ingleson et al. |
| 2005/0271279 A1 | 12/2005 | Fujimura et al. |
| 2006/0187214 A1 | 8/2006 | Gillespie et al. |
| 2006/0197753 A1 | 9/2006 | Hotelling |
| 2006/0241371 A1 | 10/2006 | Rafii et al. |
| 2006/0272436 A1 | 12/2006 | Lein et al. |
| 2007/0057946 A1 | 3/2007 | Albeck et al. |
| 2008/0120577 A1 | 5/2008 | Ma et al. |
| 2008/0281523 A1 | 11/2008 | Dahl et al. |
| 2009/0021489 A1 | 1/2009 | Westerman et al. |
| 2009/0077161 A1 | 3/2009 | Hamilton, II et al. |
| 2009/0079813 A1 | 3/2009 | Hildreth |
| 2009/0103780 A1 | 4/2009 | Nishihara et al. |
| 2009/0110301 A1 | 4/2009 | Schopp et al. |
| 2009/0153671 A1 | 6/2009 | Lee et al. |
| 2009/0183125 A1 | 7/2009 | Magal et al. |
| 2009/0228841 A1* | 9/2009 | Hildreth ............... G06F 3/0304 715/863 |
| 2009/0290811 A1 | 11/2009 | Imai |
| 2009/0307658 A1 | 12/2009 | Freitas et al. |
| 2010/0027845 A1 | 2/2010 | Kim et al. |
| 2010/0027846 A1 | 2/2010 | Xu et al. |
| 2010/0027892 A1 | 2/2010 | Guan et al. |
| 2010/0053151 A1 | 3/2010 | Marti et al. |
| 2010/0110384 A1 | 5/2010 | Maekawa |
| 2010/0124949 A1 | 5/2010 | Demuynck et al. |
| 2010/0156676 A1 | 6/2010 | Mooring et al. |
| 2010/0192109 A1 | 7/2010 | Westerman et al. |
| 2010/0199228 A1 | 8/2010 | Latta et al. |
| 2010/0202663 A1 | 8/2010 | Kim et al. |
| 2010/0208038 A1 | 8/2010 | Kutliroff et al. |
| 2010/0211920 A1 | 8/2010 | Westerman et al. |
| 2010/0229125 A1 | 9/2010 | Cha |
| 2010/0235786 A1 | 9/2010 | Maizels et al. |
| 2010/0265316 A1 | 10/2010 | Sali et al. |
| 2010/0284082 A1 | 11/2010 | Shpunt et al. |
| 2010/0296368 A1 | 11/2010 | Dahl et al. |
| 2010/0306714 A1 | 12/2010 | Latta et al. |
| 2010/0321389 A1 | 12/2010 | Gay et al. |
| 2010/0329511 A1 | 12/2010 | Yoon et al. |
| 2011/0025827 A1 | 2/2011 | Shpunt et al. |
| 2011/0052006 A1 | 3/2011 | Gurman et al. |
| 2011/0069389 A1 | 3/2011 | Shpunt |
| 2011/0075259 A1 | 3/2011 | Shpunt |
| 2011/0096954 A1 | 4/2011 | Dahl |
| 2011/0103448 A1 | 5/2011 | Dahl et al. |
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1 | 6/2011 | Snin |
| 2011/0158508 A1 | 6/2011 | Shpunt et al. |
| 2011/0164032 A1 | 7/2011 | Shadmi |
| 2011/0173574 A1 | 7/2011 | Clavin et al. |
| 2011/0187878 A1 | 8/2011 | Mor et al. |
| 2011/0188054 A1 | 8/2011 | Petronius et al. |
| 2011/0193939 A1 | 8/2011 | Vassigh et al. |
| 2011/0197161 A1 | 8/2011 | Mattingly et al. |
| 2011/0205421 A1 | 8/2011 | Shpunt et al. |

(56) References Cited

U.S. PATENT DOCUMENTS

| | | |
|---|---|---|
| 2011/0211044 A1 | 9/2011 | Shpunt et al. |
| 2011/0211073 A1 | 9/2011 | Foster |
| 2011/0211754 A1 | 9/2011 | Litvak et al. |
| 2011/0219340 A1 | 9/2011 | Pathangay et al. |
| 2011/0221974 A1 | 9/2011 | Stern et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1* | 12/2011 | Ahmed .............. G06F 3/017 715/848 |
| 2011/0298704 A1 | 12/2011 | Krah |
| 2011/0300929 A1 | 12/2011 | Tardif et al. |
| 2011/0310010 A1 | 12/2011 | Hoffnung et al. |
| 2011/0310125 A1 | 12/2011 | McEldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger |
| 2012/0050488 A1 | 3/2012 | Cohen et al. |
| 2012/0051605 A1 | 3/2012 | Nagar et al. |
| 2012/0070070 A1 | 3/2012 | Litvak |
| 2012/0078614 A1 | 3/2012 | Galor et al. |
| 2012/0088581 A1* | 4/2012 | Mao et al. ............... 463/32 |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0140094 A1 | 6/2012 | Shpunt et al. |
| 2012/0140109 A1 | 6/2012 | Shpunt et al. |
| 2012/0169583 A1 | 7/2012 | Rippel et al. |
| 2012/0169671 A1 | 7/2012 | Yasutake |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0270653 A1 | 10/2012 | Kareemi et al. |
| 2012/0274550 A1 | 11/2012 | Campbell et al. |
| 2012/0274610 A1 | 11/2012 | Dahl |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1 | 12/2012 | Shotton et al. |
| 2012/0309532 A1 | 12/2012 | Ambrus et al. |
| 2012/0313848 A1 | 12/2012 | Galor et al. |
| 2012/0313900 A1 | 12/2012 | Dahl |
| 2012/0327125 A1 | 12/2012 | Kutliroff et al. |
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1 | 2/2013 | Martin et al. |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0194180 A1 | 8/2013 | Ahn et al. |
| 2013/0201316 A1 | 8/2013 | Binder et al. |
| 2013/0216094 A1 | 8/2013 | DeLean |
| 2013/0236089 A1 | 9/2013 | Litvak et al. |
| 2013/0335573 A1 | 12/2013 | Forutanpour et al. |
| 2014/0043598 A1 | 2/2014 | Bamji et al. |
| 2014/0119599 A1 | 5/2014 | Dal Mutto et al. |
| 2014/0173440 A1 | 6/2014 | Mutto et al. |
| 2014/0211991 A1 | 7/2014 | Stoppa et al. |
| 2014/0211992 A1 | 7/2014 | Stoppa et al. |
| 2014/0298273 A1* | 10/2014 | Blackstone et al. .......... 715/863 |

FOREIGN PATENT DOCUMENTS

| | | |
|---|---|---|
| WO | 2006011153 A2 | 2/2006 |
| WO | 2007052262 A2 | 5/2007 |
| WO | 2006011153 A3 | 10/2008 |
| WO | 2008126069 A2 | 10/2008 |
| WO | 2007052262 A3 | 4/2009 |
| WO | 2008126069 A3 | 4/2009 |
| WO | 2009128064 A2 | 10/2009 |
| WO | 2009142443 A2 | 11/2009 |
| WO | 2009128064 A3 | 1/2010 |
| WO | 2010026587 A1 | 3/2010 |
| WO | 2010030296 A1 | 3/2010 |
| WO | 2010046901 A2 | 4/2010 |
| WO | 2010046901 A3 | 8/2010 |
| WO | 2010086866 A1 | 8/2010 |
| WO | 2010096279 A2 | 8/2010 |
| WO | 2010103482 A2 | 9/2010 |
| WO | 2010096279 A3 | 11/2010 |
| WO | 2010103482 A3 | 11/2010 |
| WO | 2011013079 A1 | 2/2011 |
| WO | 2011033519 A1 | 3/2011 |
| WO | 2011045789 A1 | 4/2011 |
| WO | 2012011044 A1 | 1/2012 |
| WO | 2012020380 A1 | 2/2012 |
| WO | 2012020410 A2 | 2/2012 |
| WO | 2012066501 A1 | 5/2012 |
| WO | 2012081012 A1 | 6/2012 |
| WO | 2012093394 A2 | 7/2012 |
| WO | 2012095756 A2 | 7/2012 |
| WO | 2012098534 A1 | 7/2012 |
| WO | 2012107892 A2 | 8/2012 |
| WO | 2012119633 A1 | 9/2012 |
| WO | 2012119885 A1 | 9/2012 |
| WO | 2012107892 A3 | 11/2012 |
| WO | 2012164562 A1 | 12/2012 |
| WO | 2013008236 A1 | 1/2013 |
| WO | 2013018099 A2 | 2/2013 |
| WO | 2013021385 A2 | 2/2013 |
| WO | 2012095756 A3 | 7/2013 |
| WO | 2014120554 A2 | 8/2014 |

OTHER PUBLICATIONS

"PointGrab Announces New Hand Gesture Control Solution for the Latest Premium Samsung Smart TV Models", Yahoo! Finance, Retrieved on Apr. 4, 2013, from http://www.finance.yahoo.com/news/pointgrab-announces-hand-gesture-control-22000959.html, 2 pgs.

Belaroussi, et al., "Comparison of Different Combination Strategies for Face Localization", Proceedings of the 2006 International Conference on Image Processing, Computer Vision, & Pattern Recognition, Las Vegas, Nevada, Jun. 26-29, 2006, pp. 383-389.

(56) References Cited

OTHER PUBLICATIONS

CANESTA3D, "Canesta 3D ToF Sensor Demo for Living Room", Youtube, Oct. 28, 2010, Retrieved from: http://www.youtube.com/watch?v=TmKShSHOSYU.

CANESTA3D, "Canesta PC demo video", Youtube, Oct. 25, 2010, Retrieved from: http://www.youtube.com/watch?v=I36Aqk1A6vY.

CANESTA3D, "Canesta TV Gesture User Interface Demo", Youtube, May 29, 2009, Retrieved from: http://www.youtube.com/watch?v=uR27dPHI7dQ.

CANESTA3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

CANESTA3D, "Future of Remote Control", Youtube, Oct. 29, 2009, Retrieved from: http://www.youtube.com/watch?v=vnfdoDHiNil.

CANESTA3D, "Point Cloud Demo, using Canesta's 320x200 3D Tof Image Sensor", Youtube, Oct. 28, 2010, Retrieved from: http://www.youtube.com/watch?v=4xIXsJuH74c.

Carmody, Tim, "Why 'Gorilla Arm Syndrome' Rules Out Multitouch Notebook Displays", Wired, Oct. 21, 2010, Retrieved from http://www.wired.com/gadgetlab/2010/10/gorilla-arm-multitouch/, 3 pgs.

Hasan et al., "Real Time Fingers and Palm Locating using Dynamic Circle Templates", International Journal of Computer Applications, vol. 41, No. 6, Mar. 2012, pp. 33-43.

Kerdvibulvech et al., "Markerless Guitarist Fingertip Detection Using a Bayesian Classifier and a Template Matching for Supporting Guitarists", Proc.10th Virtual Reality Int. Conf., Apr. 2008, 7 pgs.

Lin, John "Visual Hand Tracking and Gesture Analysis", Dissertation, University of Illinois at Urbana-Champaign, 2004, 116 pgs.

Murase et al., "Gesture Keyboard Requiring Only One Camera", ACM UIST'11, Oct. 16-19, 2011, Santa Barbara, CA, pp. 1-2.

Nosowitz, "The Second Wave of Gesture-Controlled TVs", Popular Science, Retrieved on Apr. 4, 2013, from: www.popsci.com/gadgets/article/2012-01/second-wave-gesture-controlled-tvs, 6 pgs.

Onishi et al., "3D Human Posture Estimation Using HOG Features of Monocular Images", Pattern Recognition, Peng-Yeng Yin (Ed.), Intech, DOI:10.5772/7541., Oct. 1, 2009, pp. 1-11.

Rautaray et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

"OV7740 VGA product brief", OmniVision, Retrieved from: http://www.ovt.com/download_document.php?type=sensor&sensorid=83, 2 pages (Oct. 2010).

Forsyth, "Computer Vision - A Modern Approach," Recognition as Template Matching, 46 pages (2002).

Kolsch et al., "Flocks of Features for Tracking Articulated Objects," Retrieved from http://www.cs.ucsb.edu/~mturk/pubs/KolschBook05.pdf, pp. 1-18, index (2005).

Zhang, Zhengyou, "Flexible Camera Calibration By Viewing a Plane From Unknown Orientations," Microsoft Research, Redmond, WA, 89 pgs. (1999).

\* cited by examiner

SYSTEMS AND METHODS FOR GESTURE BASED INTERACTION WITH VIEWPOINT DEPENDENT USER INTERFACES

FIELD OF THE INVENTION

The present invention relates to computer operating systems and more specifically to operating systems that support gesture based interaction.

BACKGROUND

Systems that employ head and body tracking are an emerging area of research and development. Several algorithmic paradigms for head and body tracking have been investigated, including the use of models, both rigid and non-rigid, and statistical classification relying upon generating a feature set to detect, e.g. with randomized decision forests, and then going through a training stage. When performing object tracking, objects such as faces are typically easier to detect than textureless objects, such as fingers.

Model-based approaches typically operate by applying model-dependent hypotheses to observable visual data. This can be framed as an optimization problem in which an objective function is minimized with respect to the divergence between collected visual data and data hypothesized by a model. Geometric models are commonly used to represent body parts. For the head, ellipsoidal, cylindrical, as well as more sophisticated models are commonly employed. The head itself can be modeled as a rigid element, and facial muscles can be optionally incorporated as non-rigid moving components. One drawback to model-based approaches is the computational cost of solving the optimization problem, especially when more sophisticated geometric models are involved. The advantage, however, is that model-based approaches do not require a training stage.

Training-based approaches typically operate by matching key points from a feature set, i.e. salient points on an image, between sample inputs and collected visual data. The crucial step in training-based approaches is to train on as large a set of sample images as possible. Increasing the number of variations in anatomy, pose, orientation, perspective, and scale can result in greater robustness, though coming at the expense of longer training time. The advantage of training-based approaches over model-based approaches is increased run-time efficiency. Thus, training-based approaches can be regarded as converting an optimization problem to a classification problem and thereby shifting the computational burden to a training stage.

SUMMARY OF THE INVENTION

Systems and methods in accordance with embodiments of the invention for performing three-dimensional (3D) gesture based interaction with a user interface rendered from a 3D object model maintained by an operating system based upon the viewpoint of a user. One embodiment includes:

a processor;

a camera system configured to capture image data;

memory containing:

an operating system including a 3D object model that describes three dimensional spatial relationships between a set of user interface objects;

a head tracking application; and an object tracking application;

wherein the operating system configures the processor to:
capture image data using the camera system;
determine a user viewpoint from which to render a user interface display by processing at least a portion of the captured image data using the head tracking application;
determine an object location by processing at least a portion of the captured image data using the object tracking application;
map the object location to a cursor location;
render a user interface display from the 3D object model and the cursor location based upon the user viewpoint;
capture additional image data using the camera system;
determine an updated user viewpoint from which to render a user interface display by processing at least a portion of the additional captured image data using the head tracking application;
determine an updated object location by processing at least a portion of the additional captured image data using the object tracking application;
map the updated object location to an updated cursor location; and
render an updated user interface display from the 3D object model and the updated cursor location based upon the updated user viewpoint, where the updated user interface display is rendered to simulate motion parallax based upon depth of the user interface objects in the 3D object model.

In a further embodiment, the operating system configures the processor to map the object location to a cursor location so that the cursor is not occluded when the processor renders a user interface display.

In another embodiment, the operating system configures the processor to map the object location to a cursor location within the 3D object model, where the cursor location has a predetermined foreground depth.

In a still further embodiment, the operating system configures the processor to map the object location to a cursor location within an overlay on a user interface display rendered from the 3D object model based upon the user viewpoint.

In still another embodiment, the operating system configures the processor to map the object location to a cursor location within the 3D object model.

In a yet further embodiment, the operating system configures the processor to render a user interface display from the 3D object model and the cursor location based upon the user viewpoint so that user interface objects that occlude the cursor location within the 3D object model are rendered to be semi-transparent.

In yet another embodiment, the operating system configures the processor to render a user interface display from the 3D object model and the cursor location based upon the user viewpoint so that the processor does not render user interface objects that are closer to a foreground of the 3D object model than the cursor location.

In a further embodiment again, the operating system configures the processor to render a user interface display from the 3D object model and the cursor location based upon the user viewpoint so that user interface objects that are rendered are scaled based upon at least the depth of the cursor location within the 3D object model.

In another embodiment again, the operating system configures the processor to render a user interface display from the 3D object model and the cursor location based upon the user viewpoint to include at least one visual indicator of the depth of the cursor location.

In a further additional embodiment, the object tracking application configures the processor to detect the 3D location of a finger within at least a portion of the captured video data, and the operating system configures the processor to map the 3D location of a finger to a cursor location within the 3D object model.

In another additional embodiment, the object tracking application configures the processor to detect pose of a human hand within at least a portion of the captured video data.

In a still yet further embodiment, the operating system configures the processor to determine a user viewpoint from which to render a user interface display by using the head tracking application to configure the processor to: determine a head pose from at least a portion of the captured image data; and map the head pose to a user viewpoint relative to a display device.

In still yet another embodiment, the operating system configures the processor to determine a user viewpoint from which to render a user interface display by using the head tracking application to configure the processor to: determine a head pose and a gaze direction from at least a portion of the captured image data; and map the head pose and gaze direction to a user viewpoint relative to a display device.

In a still further embodiment again, the operating system further configures the processor to detect a 3D gesture using the object tracking application and to modify the 3D object model in response the detected 3D gesture.

In still another embodiment again, the 3D gesture is selected from the group consisting of a static 3D gesture and a dynamic 3D gesture.

In a still further additional embodiment again, the operating system further configures the processor to detect an object location within an interaction zone.

In still another additional embodiment again, the camera system includes at least two cameras.

An embodiment of the method of the invention includes: capturing image data using a camera system; determining a user viewpoint from which to render a user interface display by processing at least a portion of the captured image data using the processor configured by a head tracking application; determining an object location by processing at least a portion of the captured image data using a processor configured by an object tracking application; mapping the object location to a cursor location using the processor configured by an operating system; rendering a user interface display from the 3D object model and the cursor location based upon the user viewpoint using the processor configured by the operating system; capturing additional image data using the camera system; determining an updated user viewpoint from which to render a user interface display by processing at least a portion of the additional captured image data using the processor configured by the head tracking application; determining an updated object location by processing at least a portion of the additional captured image data using the processor configured by the object tracking application; mapping the updated object location to an updated cursor location using the processor configured by the operating system; and rendering an updated user interface display from the 3D object model and the updated cursor location based upon the updated user viewpoint using the processor configured by the operating system, where the updated user interface display is rendered to simulate motion parallax based upon depth of the user interface objects in the 3D object model.

DETAILED DISCLOSURE OF THE INVENTION

Figure 1:
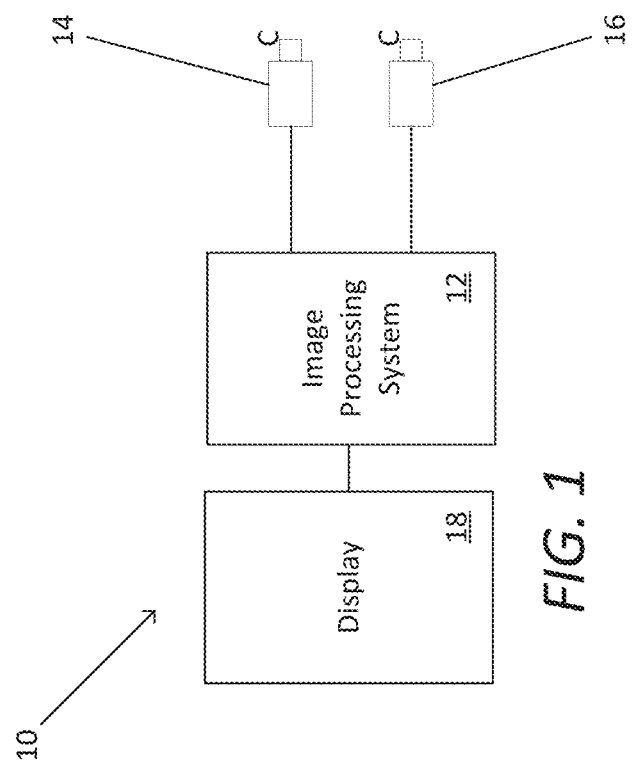
FIG. 1 is a high level block diagram of a system configured to perform gesture based interaction with a viewpoint dependent user interface in accordance with an embodiment of the invention.

Turning now to the drawings, systems and methods for performing three-dimensional (3D) gesture based interaction with a user interface rendered from a 3D object model maintained by an operating system based upon the viewpoint of a user in accordance with embodiments of the invention are illustrated. Operating systems can be found on almost any device that contains a computing system from cellular phones and video game consoles to supercomputers and web servers. A device's operating system (OS) is a collection of software that manages computer hardware resources and provides common services for user application programs. The OS typically acts as an interface between the hardware and the programs requesting input or output (I/O), CPU resources, and memory allocation. When an application executes on a computer system with an OS, the application's code is usually executed directly by the hardware and can make system calls to the OS or be interrupted by it. The portion of the OS code that interacts directly with the computer hardware and implements services for applications is typically referred to as the kernel of the OS. The portion that interfaces with the applications and users is known as the shell. The user can interact with the shell using a variety of techniques including (but not limited to) using a command line interface or a graphical user interface (GUI). A GUI typically uses a series of interface objects to represent in a consistent manner the ways in which a user can manipulate the information presented to the user via a user interface. In the context of traditional personal computers employing a keyboard and a pointing device, the most common combination of such objects in GUIs is the Window, Icon, Menu, Pointing Device (WIMP) paradigm. The limited screen size of most mobile devices has created a preference for applications that occupy the entire screen instead of being contained within windows. As such, most mobile devices that incorporate touch screen displays do not implement WIMP interfaces. Instead, mobile devices utilize GUIs that incorporate icons and menus and that rely heavily upon a touch screen user interface to enable users to identify the icons and menus with which they are interacting. Other computing environments include the tile based user interface utilized in the Windows 8 operating system distributed by Microsoft Corporation of Redmond, Wash.

User interface objects are typically data structures that represent system resources including (but not limited to) files, and applications. In many instances, user interface objects can be represented within a user interface by an associated graphical element and the user interface object and/or the operating system define the manner in which a user can interact with the interface object. Gesture based interactive systems in accordance with many embodiments of the invention utilize a spatial model of how user interface objects, such as icons and a cursor, spatially relate to one another (i.e. a user interface model). In a number of embodiments, the user interface model is constructed as a 3D object model that describes three-dimensional spatial relationships between a set of user interface objects. With a 3D object model, the operating system can use depth information to render a user interface display appropriate to the requirements of a specific display technology. An operating system can utilize visual cues such as adjusting size, perspective, shading, blurring, and occlusion of objects to convey depth as part of a process of rendering a display using a 3D object model.

Systems and methods in accordance with many embodiments of the invention are configured to use head tracking to determine a viewpoint from which to render a user interface display from a 3D object model maintained by an operating system. Any of a variety of head tracking and/or gaze tracking processes can be utilized to determine the location of a user's head in accordance with embodiments of the invention. In various embodiments, the rendering of objects within a 3D object model to provide a graphical user interface can be updated in response to detected head movements. The purpose of these updates is to reflect changes in viewpoint of the user, which can be determined by head position. In many embodiments, for example, as the head translates to the left and right, the positions of rendered user interface objects generated from a 3D object model shift accordingly within a display.

In several embodiments, an image processing system can be utilized to perform gesture tracking to enable gesture based interaction with a graphical user interface rendered by an OS based upon a viewpoint determined via head tracking. In a number of embodiments, human hands and/or parts of human hands such as fingers are tracked to enable gesture based interactions with the user interface. Tracking of fingers can pose challenges because fingers are not rigid and do not contain significant texture. Systems and methods for detecting and tracking human fingers during gesture based interactive sessions are disclosed in U.S. patent application Ser. No. 13/899,536, entitled "Systems and Methods for Tracking Human Hands by Performing Parts Based Template Matching Using Images from Multiple Viewpoints", filed May 21, 2013, the disclosure of which is incorporated by reference herein in its entirety. In a number of embodiments, tracking of a finger occurs within a 3D interaction zone. In various embodiments, there is a mapping from a 3D location within this 3D interaction zone to a location within the 3D object model.

In a number of embodiments of the invention, the mapping from a 3D location within a 3D interaction zone to a location within the 3D object model results in the cursor being mapped to a location in which the cursor would be occluded upon rendering of the 3D object model. In many embodiments, the cursor can be mapped onto an object in the 3D object model such that when the user interface is rendered the cursor is not occluded by another rendered user interface object. In these embodiments, the cursor can be mapped to a location so that it is not occluded in a display rendered from the 3D object model based upon the current viewpoint of the user. In many embodiments, the location of objects within the 3D object model are used to generate a two-dimensional image for display, and a cursor is rendered on top of the image. In various other embodiments, other approaches, such as highlighting one or more visual indicators of depth can be employed to provide visual cues as to the location of an occluded cursor. In certain embodiments, the operating system can respond to the occlusion of the cursor by rendering foreground occluding objects with increased transparency to create the impression that the user is looking through the foreground object(s). In several embodiments, the user interface is re-rendered so that the cursor is always the foremost user interface object visible on a display. In this way, the user interface can have the appearance of zooming through occluding user interface objects as the cursor moves into the user interface.

Systems and methods for enabling gesture based interaction with user interfaces generated from 3D object models based upon the viewpoint of the user in accordance with embodiments of the invention are discussed further below.

Real-Time Gesture Based Interactive Systems

A real-time gesture based interactive system in accordance with an embodiment of the invention is illustrated in FIG. 1. The real-time gesture based interactive system 10 includes an image processing system 12 configured to receive image data captured by at least one camera 14. In many embodiments, the real-time gesture based interactive system 10 processes the captured image data to determine the locations and poses of a human head and/or a human hand. 3D gestures can be static (i.e. a user placing her or his hand in a specific pose or maintaining her or his gaze in a specific direction) or dynamic (i.e. a user transitions her or his hand through a prescribed sequence of poses or turns her or his head from one direction to another). Based upon changes in the pose or orientation of the human hand and/or a part of the human hand and/or the human head over time, the image processing system can detect dynamic gestures. In a number of embodiments, the real-time gesture based interactive system 10 includes a display device 18 via which the real-time gesture based interactive system can present a user interface to the user. The operating system of the real-time gesture based interactive system 10 can maintain a 3D object model and a user interface display can be rendered from the 3D object model based upon the viewpoint of the user. In many embodiments, the user's viewpoint is determined by tracking the position of the user's head. By detecting gestures, the real-time gesture based interactive system can enable the user to interact with the rendered user interface presented via the display.

Any of a variety of head tracking and/or gaze tracking processes can be utilized to determine the location of the user's head and/or the user's viewpoint in accordance with embodiments of the invention. These techniques can include model-based approaches that operate by applying model-dependent hypotheses to observable visual data. In various embodiments, geometric models can be used to represent the head (e.g. ellipsoidal, cylindrical, as well as more sophisticated models). In various other embodiments, training-based approaches can also be incorporated. In these embodiments, training can include providing many variations in anatomy, pose, orientation, perspective, and scale. In other embodiments, any of a variety of head tracking techniques can be utilized as appropriate to the requirements of specific applications.

As noted above, object detection of human hands can be challenging due to the fact that hands typically have very low texture and are not rigid. In several embodiments, the real-time gesture based interactive system uses a parts based template matching process to detect individual fingers from which hand pose can be inferred in the manner outlined in U.S. patent application Ser. No. 13/899,536. In other embodiments, any of a variety of hand and/or finger tracking techniques can be utilized as appropriate to the requirements of specific applications.

In many embodiments, the real-time gesture based interactive system detects the location and distance to a detected finger (or other tracked objects) and overlays a cursor on the display at a location corresponding to the location on the display being pointed at by the detected finger. In several embodiments, an interaction zone is defined in 3D space and motion of a finger and/or gestures within a plane in the interaction zone or within a 3D zone in the interaction zone can be utilized to determine the location on which to overlay a cursor on the display. The real-time gesture based interactive system can track the location, distance, and orientation of the detected finger over time, enabling the user to interact with a user interface presented on the display by moving a cursor over at different elements of the user interface. In many embodiments, tracked motion of a finger and/or gesture in 3D space can be mapped to a location within a 3D object model maintained by the operating system and then rendered onto a 2D space within a user interface presented on a display device. In several embodiments, another dimension (beyond the up to three spatial dimensions) such as (but not limited to) level of zoom, change of color, and/or speed can be used for mapping. For example, in some embodiments, motion of the tip of a finger within a 2D plane can be used to determine the amount to move a cursor on a display. In other embodiments, motion of the tip of a finger within a 3D space can be mapped to a 3D zone in a 3D object model maintained by the operating system. In several embodiments, the 3D orientation of the finger can be used to identify a location on a display at which a user's finger is pointing. Accordingly, in certain embodiments a cursor is moved on the display based upon the direction in which the user's finger is pointing. In other embodiments, any of a variety of techniques can be utilized to map the orientation of one or more detected fingers to locations on a display as part of a gesture based interactive session. In a number of embodiments, the tracked motion in three-dimensional space (potentially within a 3D interaction zone) is also mapped to events supported by the operating system including (but not limited to) mouse or pen events. In many embodiments, specific static and/or dynamic gestures can be identified and adapter software running on the real-time gesture based interactive system can map specific static and/or dynamic gestures to a particular defined action within an interactive application.

Although a specific image processing system including two cameras is illustrated in FIG. 1, any of a variety of processing systems configured to capture image data from at least one view can be utilized as appropriate to the requirements of specific applications in accordance with embodiments of the invention. Image processing systems in accordance with embodiments of the invention are discussed further below.

Image Processing Systems

Figure 2:
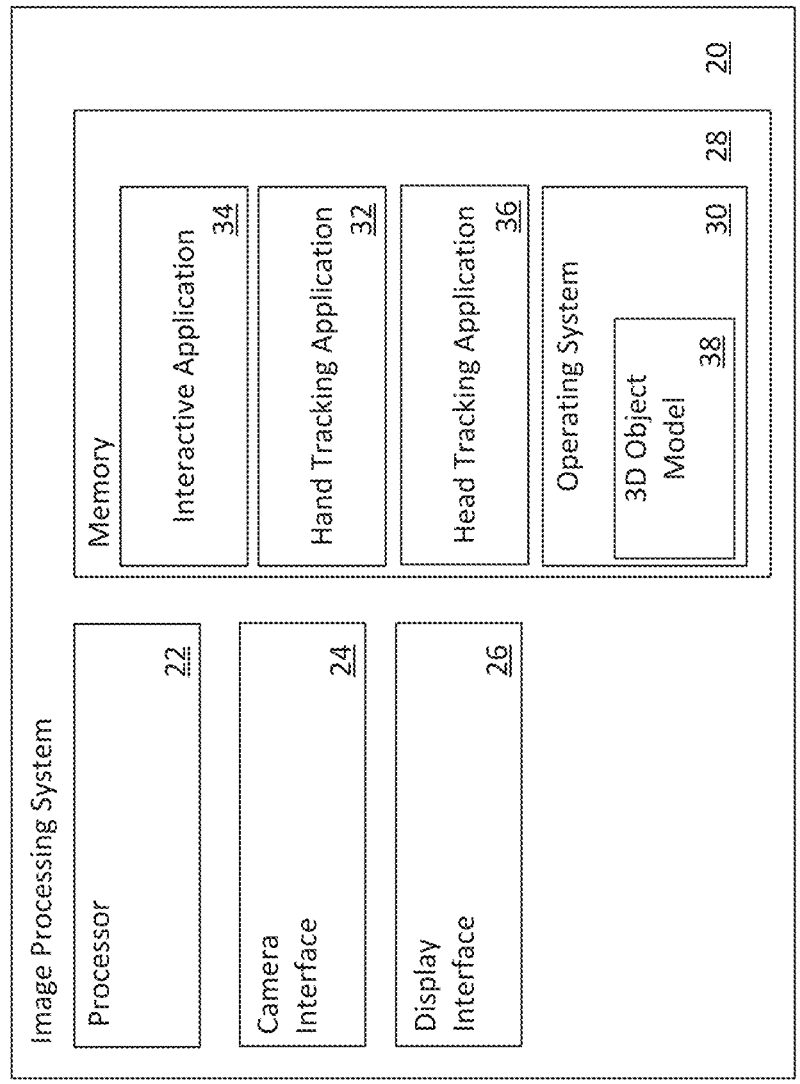
FIG. 2 is a high level block diagram of an image processing system in accordance with an embodiment of the invention.

Image processing systems in accordance with many embodiments of the invention can be implemented using a variety of software configurable computing devices including (but not limited to) personal computers, tablet computers, smart phones, embedded devices, and consumer electronics devices such as (but not limited to) televisions, disc players, set top boxes, and game consoles. An image processing system in accordance with an embodiment of the invention is illustrated in FIG. 2. The image processing system 20 includes a processor 22 that is configured to communicate with a camera interface 24 and a display interface 26. The image processing system also includes memory, which can take the form of one or more different types of storage including semiconductor and/or disk based storage. In the illustrated embodiment, the processor 22 is configured using an operating system 30. The memory 28 also includes a hand tracking application (or object racking application) 32, a head tracking application 36, and may include an interactive application 34. In the illustrated embodiment, the operating system 30 is also configured to maintain a 3D object model 38 based on the viewpoint of the user as determined by tracking the position of the user's head. The hand tracking application can be utilized to process image data received via the camera interface 24 to identify hand gestures and/or the orientation and distance of individual fingers. These hand gestures can include motions that when mapped from a 3D zone of interaction to a location within the 3D object model 38 communicate specific user interface actions including (but not limited) to mouse, pen, touch, or 3D gesture events. These hand gestures can be processed by the processor 22 to enable the user to interact with a user interface based upon a 3D object model 38 maintained by the operating system 30 and rendered by the image processing system 20. In many embodiments, the user interface can be generated by the operating system 30 or the interactive application 34. The head tracking application can also be utilized to process image data received via the camera interface 24 to identify head motions and/or the orientation and distance of the head. These head motions and/or orientations can be processed by the processor 22 to enable the user to interact with a user interface based upon a 3D object model 38 maintained by the operating system. In many embodiments, this user interface based upon a 3D object model 38 can be generated by the operating system 30 and/or the interactive application 34 making calls to the operating system and can be rendered by the image processing system 20. In other embodiments, any of a variety of configurations of computer programs within memory of an image processing system can be utilized as appropriate to the requirements of a specific application.

In many embodiments, the processor receives frames of video data via the camera interface 24 from at least one camera. The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In a number of embodiments, the received frames of video data include image data represented using the RGB color model represented as intensity values in three color channels. In several embodiments, the received frames of video data include monochrome image data represented using intensity values in a single color channel. In several embodiments, the image data represents visible light. In other embodiments, the image data represents intensity of light in non-visible portions of the spectrum including (but not limited to) the infrared, near-infrared, and ultraviolet portions of the spectrum. In certain embodiments, the image data can be generated based upon electrical signals derived from other sources including but not limited to ultrasound signals. In several embodiments, the received frames of video data are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data. In several embodiments, the camera systems that capture the image data also include the capability to capture dense depth maps and the image processing system is configured to utilize the dense depth maps in processing the image data received from the at least one camera system. In several embodiments, the camera systems include 3D sensors that capture dense depth maps including (but not limited to) time-of-flight and/or structured light cameras.

In many embodiments, the display interface 26 is utilized to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized.

Although a specific image processing system is illustrated in FIG. 2, any of a variety of image processing system architectures capable of executing head tracking and hand tracking processes can be utilized in accordance with embodiments of the invention. Use of depth information by operating systems in accordance with embodiments of the invention is discussed further below.

Use of Depth by Operating Systems

Figure 3:
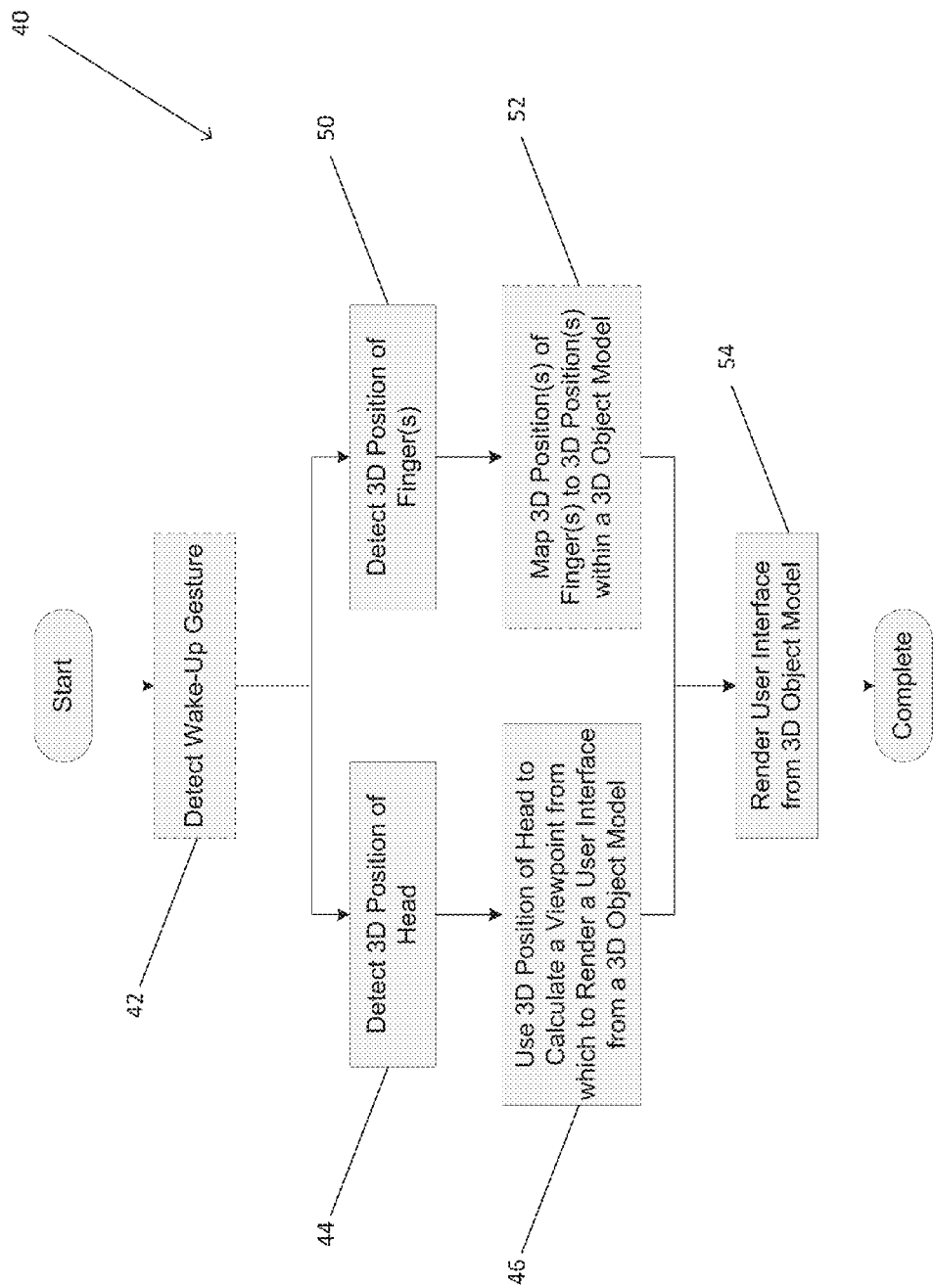
FIG. 3 is a flow chart illustrating a process for mapping 3D gestures for interaction with a viewpoint dependent user interface in accordance with an embodiment of the invention.

Operating systems in accordance with many embodiments of the invention incorporate a three-dimensional model of how user interface objects, such as icons and a cursor, are spatially related to one another (i.e. a user interface model) to allow for the utilization of depth information in the rendering of a user interface. With a 3D object model, the operating system can render depth information (e.g. by utilizing visual cues such as adjusting size, perspective, shading, blurring, and occlusion of objects). A process for utilizing depth information by using head tracking to determine the user's viewpoint and by mapping finger movements from a 3D interaction zone to a location within a 3D object model to render a user interface in accordance with an embodiment of the invention is illustrated in FIG. 3. The process 40 includes, in some embodiments, detecting 42 a wake-up gesture. In those embodiments, waving of a hand, waving of both hands, waving of one or more arms, moving the head and/or upper body from side to side, or any other movement indicating that attention is sought could be used as a wake-up gesture. In a number of embodiments, the process also includes detecting 44 the position of the head and detecting 50 the position of one or more fingers. In a number of embodiments, the processes of detecting the head and finger positions can occur concurrently. Detecting the position of the head can be accomplished by detecting features that would be found in the head (e.g. eyes, nose, mouth, and the general shape of the head). In several embodiments, detecting position of the head involves fitting detected translations of features of the head to the translations that would be observed if a model of the head (whether ellipsoidal, cylindrical, or more sophisticated models) moved through space. In various embodiments, training based on variations in head anatomy, pose, orientation, perspective, and scale can be incorporated. In other embodiments, any of a variety of head tracking techniques can be utilized as appropriate to the requirements of specific applications.

After the spatial position of the head and/or features of the head are detected, those detected positions are typically sent for further processing 46, which can include using the detected positions to calculate a viewpoint from which to render a user interface based upon a 3D object model. As discussed further below, the rendering of the user interface changes depending on the user's viewpoint. In many embodiments, the user's viewpoint is determined based upon the orientation of the user's head. In some embodiments, the head looking straight at the screen is the baseline condition and maps to a non-rotated and non-translated viewpoint of the user interface. An updated viewpoint of the user interface in response to head movement could be calculated by any of a variety of methods described in more detail below. In various embodiments, any of a variety of techniques to update the viewpoint of the user interface can be utilized as appropriate to the requirements of a specific application.

In several embodiments, the process 50 of detecting the position(s) of one or more fingers can be accomplished with systems and methods disclosed in U.S. patent application Ser. No. 13/899,536. In several embodiments, processes similar to the process illustrated in FIG. 3 can utilize a parts based template matching process to detect individual fingers. In a number of embodiments, tracking of a finger occurs within a 3D interaction zone. In some embodiments, there is a mapping 52 from a 3D location within this 3D interaction zone to a location within the 3D object model. The mapping from a 3D position of a single finger to a 3D position within a 3D object model can be a one-to-one mapping. A one-to-one mapping can be used to represent the movement of a cursor in response to the tracked location of a finger or fingertip. In other embodiments, the detected 3D position of a finger can be passed directly to the operating system for rendering a cursor without first mapping to a 3D position within a 3D object model. In some of those embodiments, the finger position is mapped to a position on the display (as opposed to within the 3D object model) so that a cursor is overlaid on top of other objects in the rendered user interface. In various embodiments, any of a variety of techniques to map or translate the position(s) of one or more fingers for rendering a user interface can be utilized as appropriate to the requirements of a specific application.

In various embodiments, the process 40 includes rendering the user interface. As noted above, a cursor corresponding to finger location can be rendered directly or from a 3D object model. The icons in the user interface are typically rendered from a 3D object model in response to head orientation. In some embodiments, the user interface is rendered as a two-dimensional image. In that case, a standard display device such as (but are not limited to) cathode ray tubes, liquid crystal displays, plasma displays, and light-emitting diode displays can be used. In various embodiments, monitors that are able to display a separate image for each eye, sometimes with the help of special glasses, can be used to present a user interface display that allows for the perception of depth. In these embodiments, the use of a stereo pair allows for the presentation of a 3D user interface. In other embodiments, real 3D displays that can display an image in three full dimensions can be used. In various embodiments, any of a variety of display technologies can be utilized to present a user interface as appropriate to the requirements of a specific application.

Although specific processes are described above with reference to FIG. 3, any of a variety of processes can be utilized to render a user interface based upon a 3D object model and detected head and finger movements as appropriate to the requirements of specific applications in accordance with embodiments of the invention. Systems and methods that utilize head tracking to render user interfaces depending on the user's viewpoint in accordance with embodiments of the invention are discussed below.

Viewpoint Dependent Rendering by Head Tracking

Figure 4:
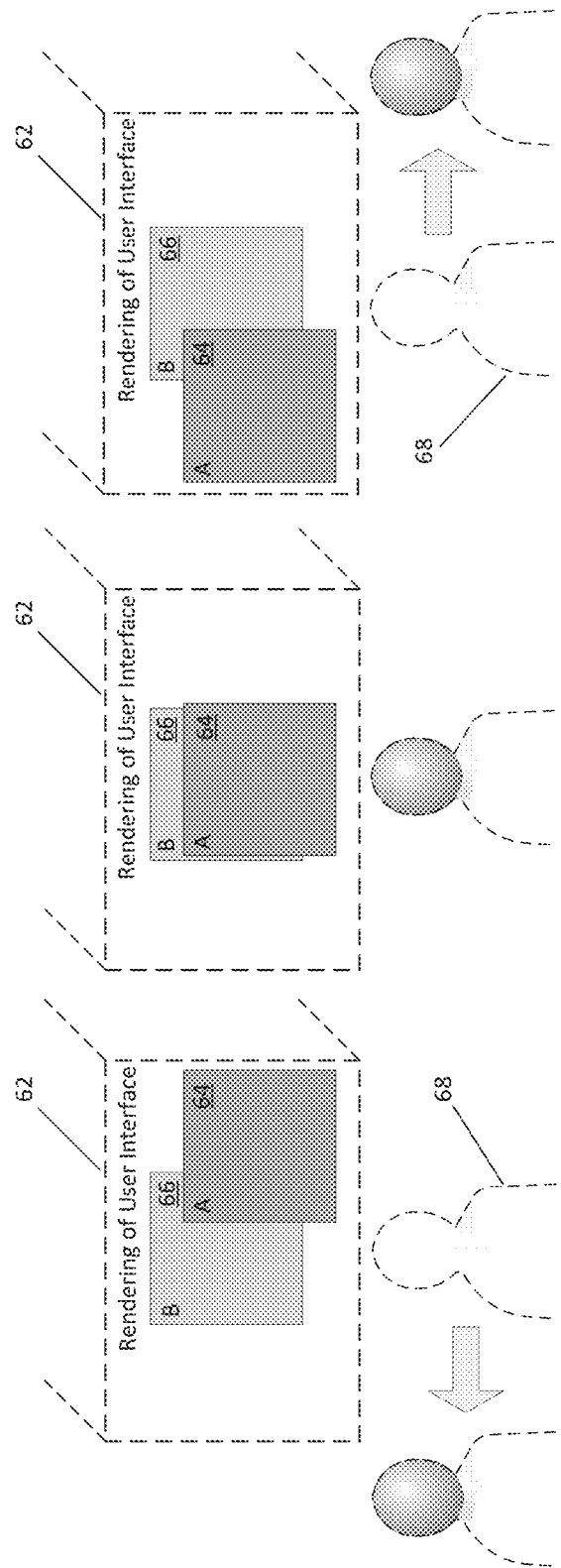
FIGS. 4A-4C conceptually illustrates a process for rendering a user interface based upon the viewpoint of a user in accordance with an embodiment of the invention.

The rendered positions of objects in user interfaces in accordance with many embodiments of the invention depend on the viewpoint of the user determined via head tracking processes. With viewpoint dependent rendering, the operating system can exploit motion parallax effects to provide the user with a sensation of depth. Motion parallax is a depth cue in which a viewer's motion causes objects closer to the viewer to move farther across a viewer's field of view than do objects farther away from the viewer. FIGS. 4A-4C conceptually illustrate a process for rendering a user interface on a 2D display based upon the viewpoint of a user to simulate motion parallax. A typical 2D display is incapable of displaying depth. Modifying the position of objects within a 2D display as a user moves her or his head can simulate motion parallax. In this way, the moving objects in the display provide visual cues corresponding to the visual cues that would be experienced were the objects actually positioned at different depths. An initial state is illustrated in FIG. 4A in which two rendered user interface objects A 64 and B 66 are generated to form a user interface display. The 3D object model upon which the rendering 62 of the user interface is based incorporates depth information, which can be used to simulate motion parallax as the user's head moves. In the illustrated embodiment, rendered user interface object A 64 is in the foreground and rendered user interface object B 66 is in the background. As is discussed further below, the depth of objects within the 3D object model is used to determine occlusions and the locations in which the objects are rendered based upon information concerning the viewpoint of the user. The rendering 62 of the user interface when the user shifts viewpoint from the initial position 68 shown in FIG. 4A to the user's left is illustrated in FIG. 4B. The presentation of rendered user interface objects A 64 and B 66 changes to reflect the change in viewpoint. As can be seen in FIG. 4B, the position of A 64 in the rendered user interface is shifted to the right (relative to B and the position of object A in FIG. 4A). The rendering 62 of the user interface when the user shifts his or her viewpoint from the initial position 68 shown in FIG. 4A to the user's right is illustrated in FIG. 4C. In this case, the position of foreground object A 64 in the rendered user interface is shifted to the left (relative to background object B and the position of object B in FIG. 4A). FIG. 4B and FIG. 4C illustrate greater movement of the foreground object A 64 across the user's field of view than the background object B 66 in response to the user's movement.

Any of a variety of rendering processes can be utilized to render updated user interfaces for display in response to changes in a user's viewpoint to simulate motion parallax in accordance with embodiments of the invention. These processes can include the step of calculating and/or utilizing a lookup table to determine a transformation to be applied to objects within a 3D object model and/or a previously rendered user interface so that the updated rendering properly reflects the change in the user's viewpoint. In some embodiments, the transformation can be two-dimensional. For example, in many embodiments, techniques that include (but are not limited to) translating in a plane parallel to the display can be utilized. In many embodiments, the association between the amount of head movement and the distance a rendered object moves can be linear. In other embodiments, non-linear associations including (but not limited to) exponential and logarithmic relationships can be utilized that artificially heighten the sense of motion parallax. In many embodiments, the distance a rendered object moves across the user's field of view depends on the depth associated with the object. For example, when icons or windows are layered on top of each other, the icons or layers in the foreground typically move greater distances than those in the background. In several embodiments, 3D transformations can be applied to objects within the 3D object model including (but not limited to) rotations and changes in color to simulate changes in illumination and/or other visual cues that assist in the simulation of motion parallax. In other embodiments, any of a variety of associations between viewpoint changes and object rendering can be utilized as appropriate to the requirements of a specific application.

Although specific transformations relating to viewpoint change and rendering of the user interface have been described, any of a variety of transformation techniques can be utilized as appropriate to the requirements of specific applications in accordance with embodiments of the invention. Gesture based interaction with computing devices in accordance with embodiments of the invention are discussed further below.

Gesture Based Interaction with Computing Devices

Image processing systems in accordance with many embodiments of the invention can be used to track hand gestures and/or locations of parts of hands, which can be one means of interacting with the user interface of a computing device. With the tracking of parts of hands, including (but not limited to) the tracking of individual fingers, it is possible to enable interaction with an operating system by mapping the location of a part of a hand in the physical world to a corresponding location within the user interface of the computing device. The mapping can be considered to be a mapping of physical coordinates to virtual coordinates (e.g. a location in a 3D object model maintained by an operating system). Physical coordinates can be determined based upon the position of a tracked hand or part of a hand relative to a fixed location, and can be expressed in terms of polar and/or Cartesian coordinates relative to the fixed location. In several embodiments, physical coordinates are expressed relative to a defined 3D interaction zone. As noted above, any of a variety of techniques can be utilized to determine the physical coordinates of a tracked hand and/or part of a hand including (but not limited to) the techniques described in U.S. patent application Ser. No. 13/899,536.

Figure 5:
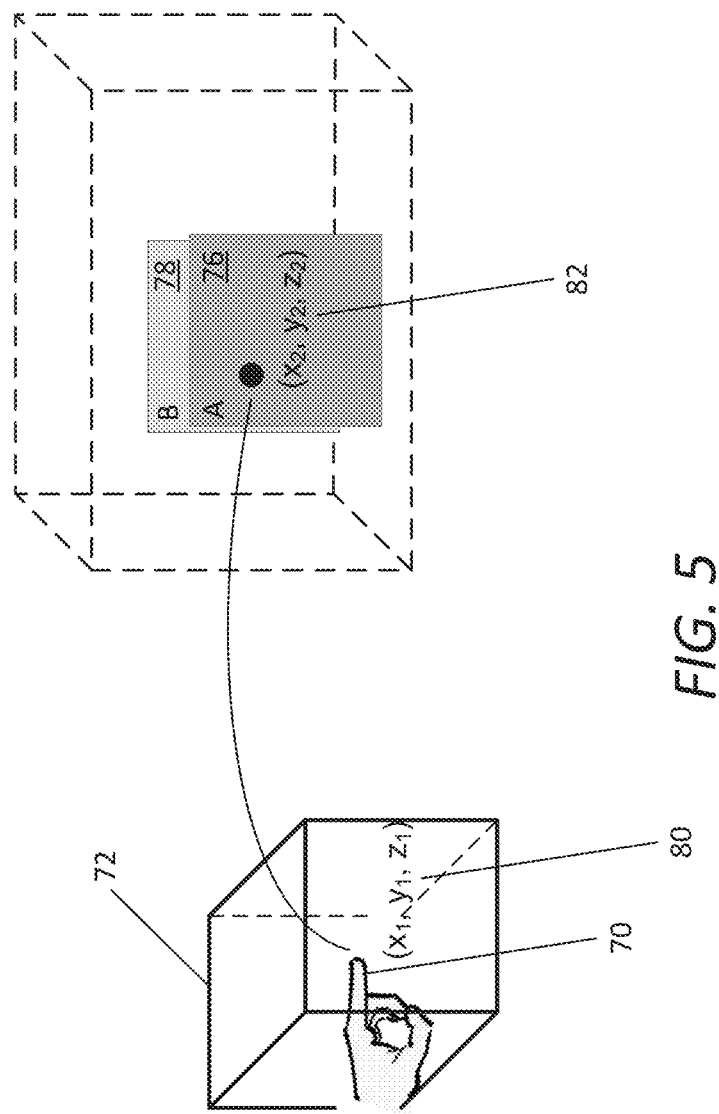
FIG. 5 conceptually illustrates a process for mapping a location of a gesture to a location in a 3D object model in accordance with an embodiment of the invention.

A process for mapping a gesture to virtual coordinates within a 3D object model maintained by an operating system of a computing device in accordance with an embodiment of the invention is illustrated in FIG. 5. An image processing system (not shown) is used to determine the physical coordinates 80 of a fingertip 70 within a 3D zone of interaction 72. The image processing system can provide the physical coordinates to the operating system, which maps the physical coordinates to virtual coordinates 82 within the 3D object model. In many embodiments, finger movements are not registered unless they occur within the 3D zone of interaction 72. In this illustration, the 3D object model maintains representations for objects A 76 and B 78 to be rendered by the operating system in accordance with embodiments of the invention. As illustrated, objects A 76 and B 78 have a depth relationship with each other, with object A 76 being represented as located in the foreground relative to object B 78.

Any of a variety of techniques can be utilized to perform mappings to support gesture based interaction in accordance with embodiments of the invention. In several embodiments, the cursor is always in the foreground (i.e. cannot be occluded by another user interface object). In a number of embodiments, the cursor can occupy any position within the 3D space defined by the 3D object model. In several embodiments, the cursor can be occluded by other user interface objects. In certain embodiments, visual indicators are provided to identify the location of the cursor. In many embodiments, occluding user interface objects are rendered with increased transparency (i.e. semi-transparent) so that the cursor is visible through the occluding user interface object. In some embodiments, the 3D object model is rendered so that the cursor is the user interface object closest to the viewer. In this way, a user experience is provided in which the cursor "moves through" occluding interface objects as the user directs the cursor deeper into the user interface. In other embodiments, any of a variety of techniques can be utilized to render a user interface from a 3D object model based upon the physical coordinates of an object such as a finger or fingertip within a 3D zone of interaction in accordance with embodiments of the invention. Systems and methods for rendering user interfaces from 3D object models in a viewpoint dependent manner so that the cursor is located in the foreground of the rendered user interface in accordance with embodiments of the invention are discussed further below.

Rendering User Interfaces from 3D Object Models so that the Cursor Remains in the Foreground A variety of techniques can be utilized in accordance with embodiments of the invention to render a user interface from a 3D object model in a viewpoint dependent manner so that a cursor is located in the foreground of the rendered user interface including (but not limited to) mapping the physical coordinates of a gesturing object to virtual coordinates within a 3D object model with the depth coordinated fixed at a predetermined foreground depth. Alternatively, a 2D display can be rendered in a viewpoint dependent manner from a 3D object model and the physical coordinates of the gesturing object can be mapped to a location within the rendered 2D display. The cursor can then be overlaid on the 2D display in the mapped location. In the latter approach, the mapping can be viewpoint dependent or viewpoint independent.

Figure 6:
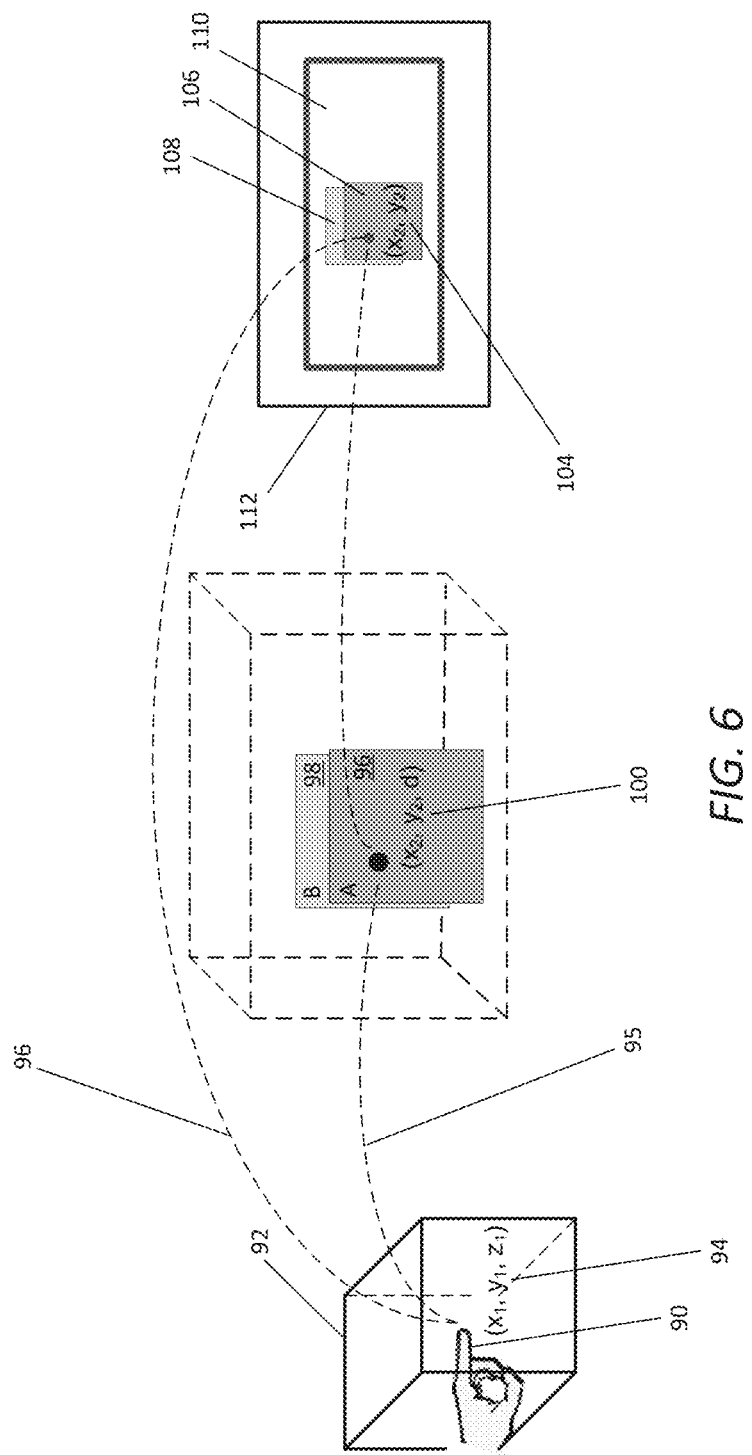
FIG. 6 conceptually illustrates a process for rendering a viewpoint dependent user interface based on a 3D object model in which a cursor is rendered on top of other rendered user interface objects based upon the detected location of a user gesture in accordance with an embodiment of the invention.

A process for mapping gesture location to a location within a user interface rendered from a 3D object model based upon viewpoint of a user in accordance with an embodiment of the invention is illustrated in FIG. 6. The physical coordinates 94 of a finger or fingertip 90 within a 3D zone of interaction 92 can be mapped 95 to virtual coordinates 100 within a 3D object model with a depth corresponding to a fixed foremost foreground depth d or the 3D object model can be used to render a 2D display and the physical coordinates 94 of the finger or fingertip 90 within a 3D zone of interaction 92 can be mapped 96 to a location on the rendered 2D display. In this illustration, the 3D object model maintains representations A 96 and B 98 for user interface objects 106, 108 respectively to be rendered by the operating system onto a region 110 of a display 112. The user interface objects 106, 108 can be rendered based on viewpoint in a manner that exploits motion parallax effects as outlined above. Any of a variety of methods can be selected to map virtual coordinates 100 in the 3D object model to coordinates 104 on a display 112.

In embodiments where the cursor is mapped 95 to virtual coordinates 100 in the 3D object model at a fixed foreground depth d, the cursor is rendered on top of other objects when a user interface is rendered from the 3D object model. Alternatively, processes in accordance with embodiments of the invention can simply generate a mapping 96 to overlay the cursor on top of a display rendered from the 3D object model to achieve a similar result. Using either class of process, the perception of depth is still present despite the cursor being constrained to a 2D plane due to the exploitation of motion parallax effects that are enabled by viewpoint dependent rendering via head tracking. In several embodiments, the user experience is similar to that of moving the cursor on the display as the user interface is modified to simulate motion parallax (i.e. user interface objects may move when a change in viewpoint is detected, but the cursor mapping may be invariant with respect to viewpoint). In other embodiments, movement of a user's head can result in a shift in cursor position in a manner similar to that in which the other user interface objects are shifted.

Figure 7:
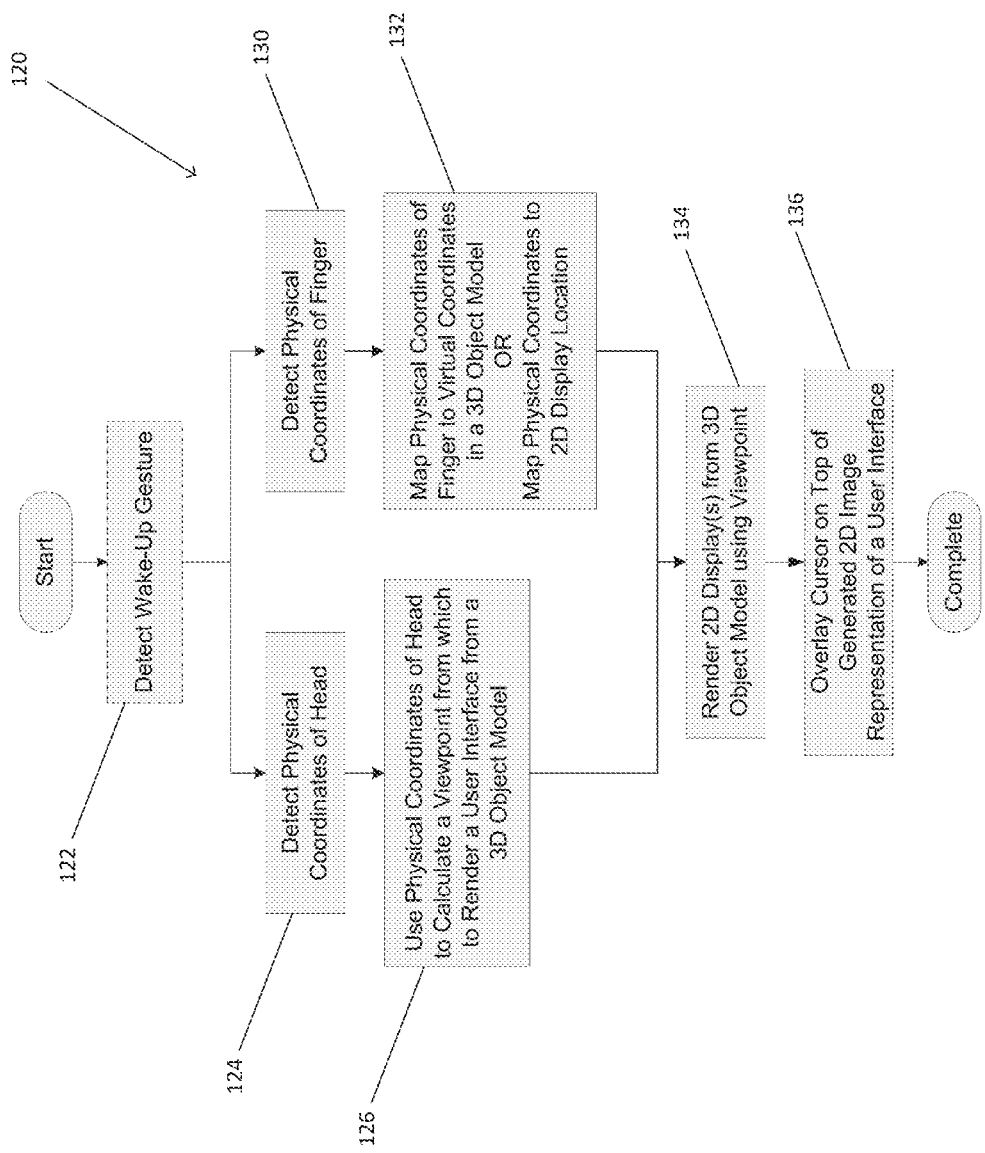
FIG. 7 is a flow chart illustrating a process for using a cursor that is overlaid on top of other user interface objects to interact with a viewpoint dependent user interface in accordance with an embodiment of the invention.

A process for using gestures to interact with a computing device by tracking finger position to enable the rendering of a cursor overlaid on top of other rendered objects in a viewpoint dependent user interface in accordance with an embodiment of the invention is illustrated in FIG. 7. The process 120 optionally includes detecting (122) a wake-up gesture, which can be utilized to commence head and finger tracking and/or to define a 3D interaction zone. The position of the head is detected (124) and the head position is used to determine (126) a viewpoint from which to render a user interface based on a 3D object model. The position of a finger is also detected (130), and can optionally be mapped (132) to a location within a 3D object model at predetermined foreground depth. Alternatively, the position of the finger can be mapped (132) to a location on a 2D display. Either mapping can be performed using a mapping function and/or a look-up table.

In the illustrated embodiment, a two-dimensional image representation of a user interface is rendered (134) from the 3D object model (which may or may not include the cursor as one of a number of interface objects) based upon the calculated (126) viewpoint. In many embodiments, the two-dimensional image representation of a user interface can be rendered (134) by any of a variety of projection techniques that convert a three-dimensional representation to a two-dimensional one. In various embodiments, this could consist of converting a 3D object model to a 2D representation. In many embodiments, this could include discarding objects or portions of objects in the 3D object model that are occluded by other objects. In a number of embodiments, the 2D representation could store the horizontal location, vertical location, horizontal extent, and vertical extent of objects. In many embodiments, the depth component can be used to scale user interface objects according to depth (horizontal and vertical extents of objects further in the background scaled smaller and horizontal and vertical extents of objects closer to the user scaled larger). In various embodiments, the horizontal and vertical locations of objects can be translated according to the user's viewpoint. In a number of embodiments, a continuous conversion can also be used. In various embodiments, any of a variety of projection and conversion techniques relating to generating 2D image representations and/or cursor coordinates can be utilized as appropriate to the requirements of specific applications. Where the cursor is mapped to a 2D display location instead of to a location at a predetermined depth within a 3D object model, the process 120 overlays (136) the cursor on the user interface rendered from the 3D object model.

Although specific processes are described above with reference to FIG. 7, any of a variety of processes can be utilized to map detected head and finger movements for use with a 3D object model from which a user interface can be rendered so that the cursor is the foremost user interface object. Systems and methods for rendering a user interface from a 3D object model in which a cursor can be located behind other user interface objects based upon user viewpoint in accordance with embodiments of the invention are further discussed below.

Figure 8B:
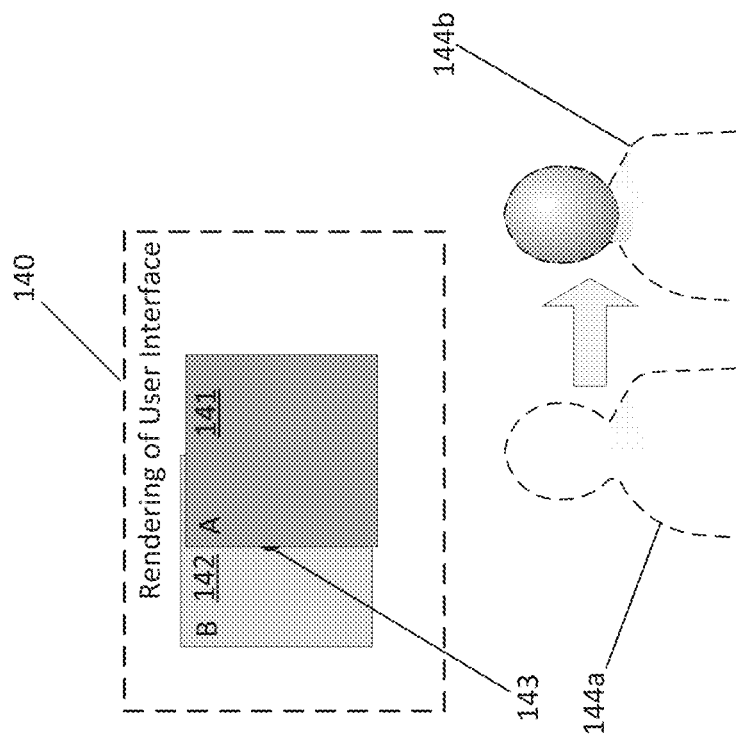
FIGS. 8A and 8B conceptually illustrate the occlusion of a cursor in a user interface rendered from a 3D object model using a rendering process that determines the manner in which to render a user interface display based upon the viewpoint of a user in accordance with embodiments of the invention.
Figure 8A:
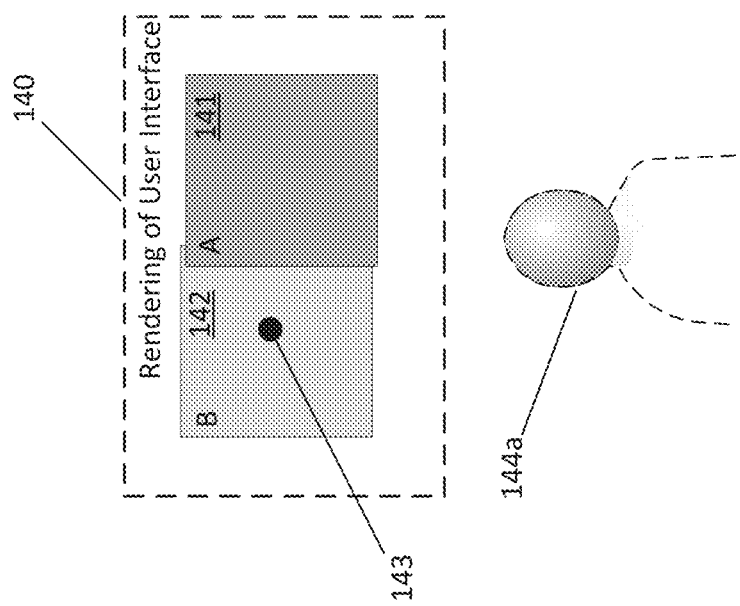

Rendering User Interfaces where Cursors can be Occluded by Other Interface Objects A 3D object model can be utilized in accordance with many embodiments of the invention in which a cursor user interface object can be positioned at various depths within the 3D object model. Depending upon the location of the cursor, the rendering of a user interface from the 3D object model may result in the occlusion of the cursor. The potential for a cursor to become occluded by a change of user viewpoint is illustrated in FIGS. 8A and 8B. A rendered user interface 140 is shown in FIG. 8A, which includes a foreground user interface object A (141), a background user interface object B (142), and a cursor 143. As the user shifts from viewpoint 144a to 144b, the manner in which the user interface is rendered responds to the shift in viewpoint and the result is a user interface in which foreground object A (141) partially occludes the cursor 143.

Although occlusion of a cursor within a user interface rendered from a 3D object model based upon a shift in viewpoint of a user is described above with reference to FIGS. 8A and 8B, occlusions can be created in any of a variety of ways in such a user interface simply as a result of user gestures corresponding to locations within the 3D object model in which the cursor is occluded by other user interface objects. In several embodiments, the process of rendering a user interface display from a 3D object model considers cursor location. In several embodiments, occluding user interface objects are rendered with increased transparency so that the cursor is visible through occluding user interface objects. In certain embodiments, occluding user interface objects are not rendered and/or user interface objects that are rendered may be scaled to simulate moving deeper into the user interface. In a number of embodiments, one or more visual indicators are rendered within the user interface to provide visual indicators of an occluded cursor. In other embodiments, any of a variety of techniques can be utilized to render a user interface display from a 3D object model in a manner that considers user viewpoint and/or cursor location.

Figures 9, 10A:
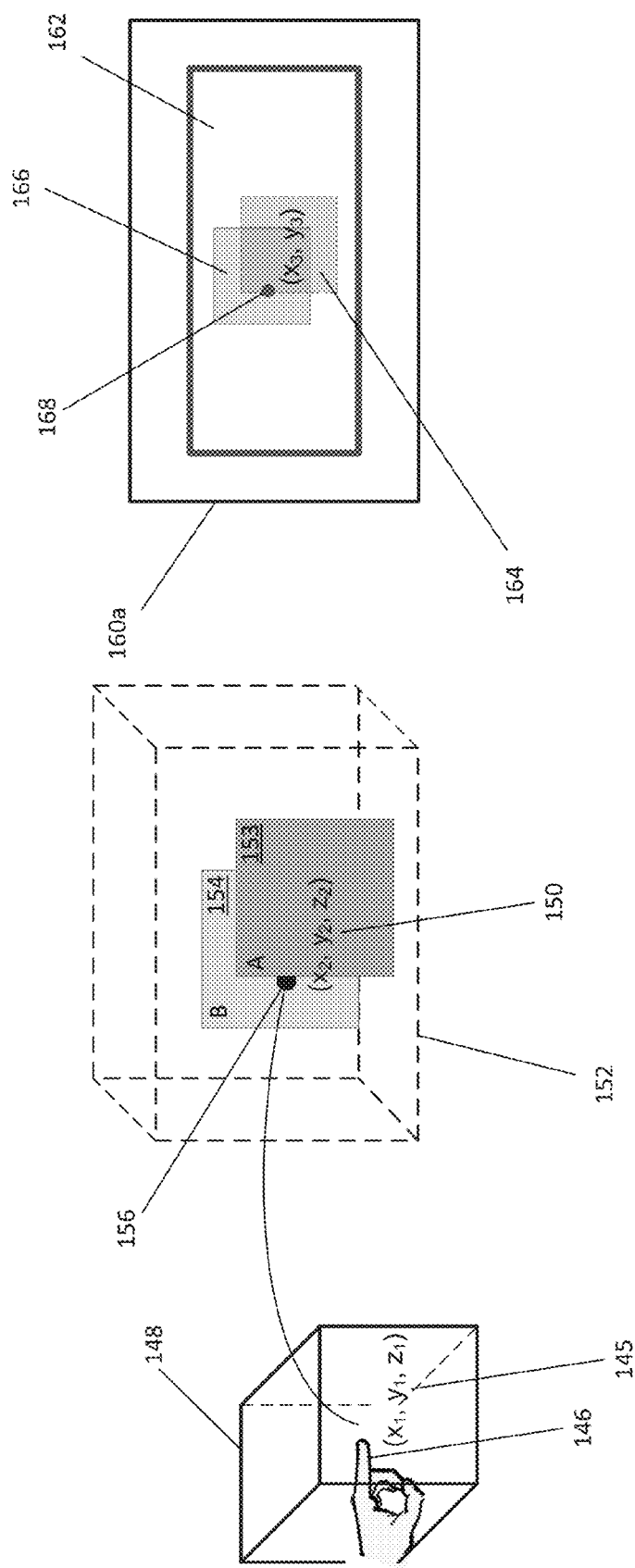
FIG. 9 conceptually illustrates detection of the location of a tracked object, such as a finger, and the mapping of the detected location to virtual coordinates within a 3D object model in accordance with an embodiment of the invention.
FIGS. 10A-10C conceptually illustrate a variety of processes that render user interface displays from a 3D object model in a manner that depends upon the depth coordinate of a cursor user interface object within the 3D object model in accordance with an embodiment of the invention.

A process for mapping a finger location to 3D virtual coordinates in a 3D object model from which a viewpoint dependent user interface can be rendered is illustrated in FIG. 9. The physical coordinates 145 of a finger or fingertip 146 within a 3D zone of interaction 148 can be mapped to virtual coordinates 150 within a 3D object model 152.

In a number of embodiments, a one-to-one mapping between a location within a 3D zone of interaction 148 and the 3D object model 152 can be utilized. In many embodiments, the mapping from finger location to a location within a 3D object model can be continuous. In other embodiments, there can be a discrete set of positions within a 3D object model to which finger locations could be mapped and/or a discrete set of positions within a 3D zone of interaction 148 that could map to locations within a 3D object model. For example, a cursor may "snap to" the locations of user interface objects within the 3D object model. The amount of finger movement that is required for the image processing system to register a finger movement can be configured according to the requirements of a specific application. Capturing only relatively large finger movements can be appropriate for interaction with user interfaces that are rendered coarsely. Conversely, capturing fine movement can be appropriate for intricate user interface actions and/or manipulations. In various embodiments, any of a variety of finger mapping processes can be utilized as appropriate to the requirements of a specific application.

In the illustrated embodiment, the 3D object model 152 includes a foreground user interface object A (153), a background user interface object B (154), and a cursor user interface object (156). The coordinates 150 to which the physical coordinates 145 map the cursor user interface object 156 result in the cursor user interface object being located at a depth between the depth of the foreground user interface object A (153) and the depth the of the background user interface object B (154). Depending upon the manner in which a user interface display 160 is rendered, the foreground user interface object A (153) can occlude the cursor.

A user interface display rendered from a 3D object model so that occluding user interface objects are semi-transparent in accordance with an embodiment of the invention is illustrated in FIG. 10A. The 2D user interface display 160a includes a region 162 rendered from the 3D object model illustrated in FIG. 9. In the illustrated embodiment, the foreground user interface object A (153) from FIG. 9 is rendered in a semi-transparent manner (164) so that the cursor 168 is visible through the rendered foreground user interface object A (164). The background user interface object B (154) shown in FIG. 9 is rendered (166) behind the cursor 168. As can readily be appreciated, the rendering of the user interface display 160 from a 3D object model is dependent upon the virtual coordinates 150 of the cursor (i.e. the location of the cursor user interface object within the 3D object model).

Rendering occluding user interface objects to be sufficiently transparent that the cursor and/or other user interface objects located behind the occluding user interface object(s) are visible is only one manner in which a user interface display can be rendered in a manner that is responsive to the coordinates of the cursor user interface object. A user interface display rendered from a 3D object model so that user interface objects that are located within the 3D object model closer to the foreground than the cursor user interface object are not rendered in accordance with an embodiment of the invention is illustrated in FIG. 10B. Instead of rendering the foreground object A (153) shown in FIG. 9 as transparent, the rendering that resulted in the rendered user interface 160b involved not rendering any user interface object within the 3D object model that was located at a depth closer to the foreground of the 3D object model than the depth of the cursor user interface model. In addition, the remaining user interface objects (166) located behind (i.e. at a greater depth within the 3D object model than) the cursor (168) are increased in size. As can readily be appreciated, rendering the remaining user interface objects with increased size is optional but can create a user experience in which user gestures cause the cursor (and the user with it) to move deeper into the user interface. Where the user interface display is also rendered in a manner that is dependent upon user viewpoint (as determined by head tracking or similar techniques), the manner in which a user interface display is rendered from a 3D object model to simulate motion parallax can vary depending upon the depth of the cursor within the display.

Figure 10C:
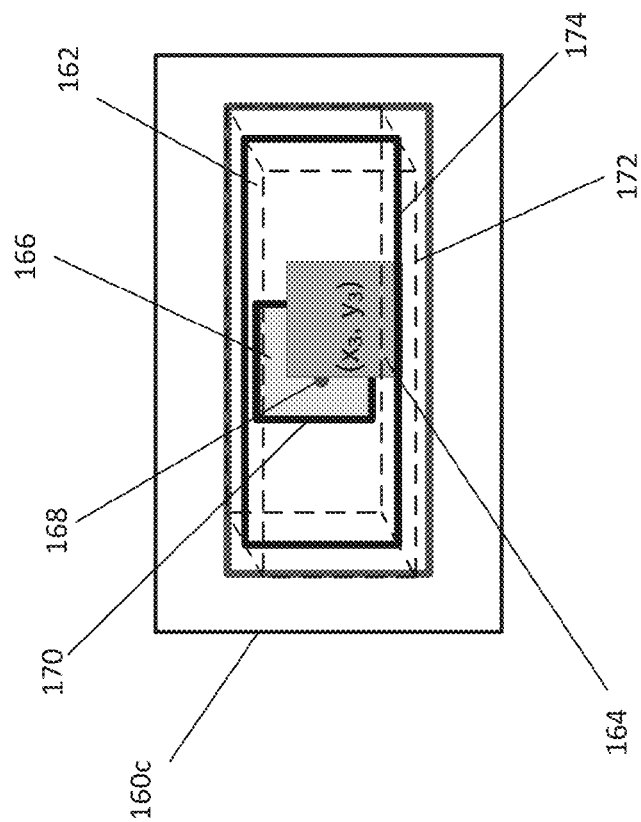
Figure 10B:
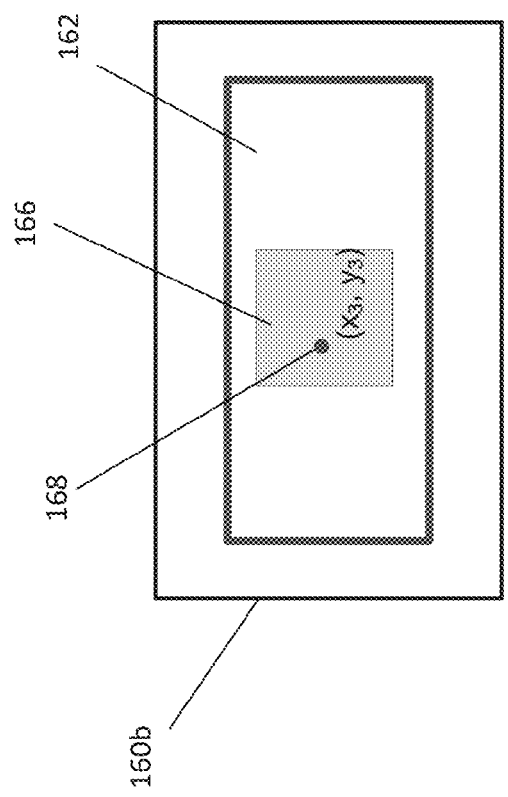

A user interface display rendered from a 3D object model in a manner that allows for a cursor to be occluded, but that includes additional visual cues to assist the user with determining the location of an occluded cursor, in accordance with an embodiment of the invention is illustrated in FIG. 10C. In the illustrated embodiment, the foreground user interface object A (153) and the background user interface object B (154) shown in FIG. 9 are rendered as they would be irrespective of cursor position. However, the user interface object 166 immediately behind the cursor 168 is highlighted 170 to indicate that it is a user interface object capable of being targeted for interaction using by the cursor 168. In many embodiments, additional visual cues can be provided such as (but not limited) graphic elements evoking a bounding volume and indicia located at the periphery of the bounding volume to indicate the depth and/or location of the cursor. In the illustrated embodiment, the rendered user interface display 160c includes graphic elements (172) evoking a bounding cube (the user interface display is rendered as 2D images) and a rectangular highlight 174 corresponding to the plane within the 3D object model of the cursor 168. In other embodiments, a bounding volume is not rendered and/or indicia of the location of the cursor not only indicate the plane of the cursor, but the position of the cursor within the plane.

Although specific processes for rendering user interface displays in a manner that is dependent upon the location of a cursor user interface element within a 3D object model are described above with reference to FIG. 9 and FIGS. 10A-10C, any of a variety of processes can be utilized to render user interface displays from 3D objects models in a manner that is dependent upon the viewpoint of the user and/or the location of a cursor user interface object within the 3D object model as appropriate to the requirements of specific applications in accordance with embodiments of the invention.

Figure 11:
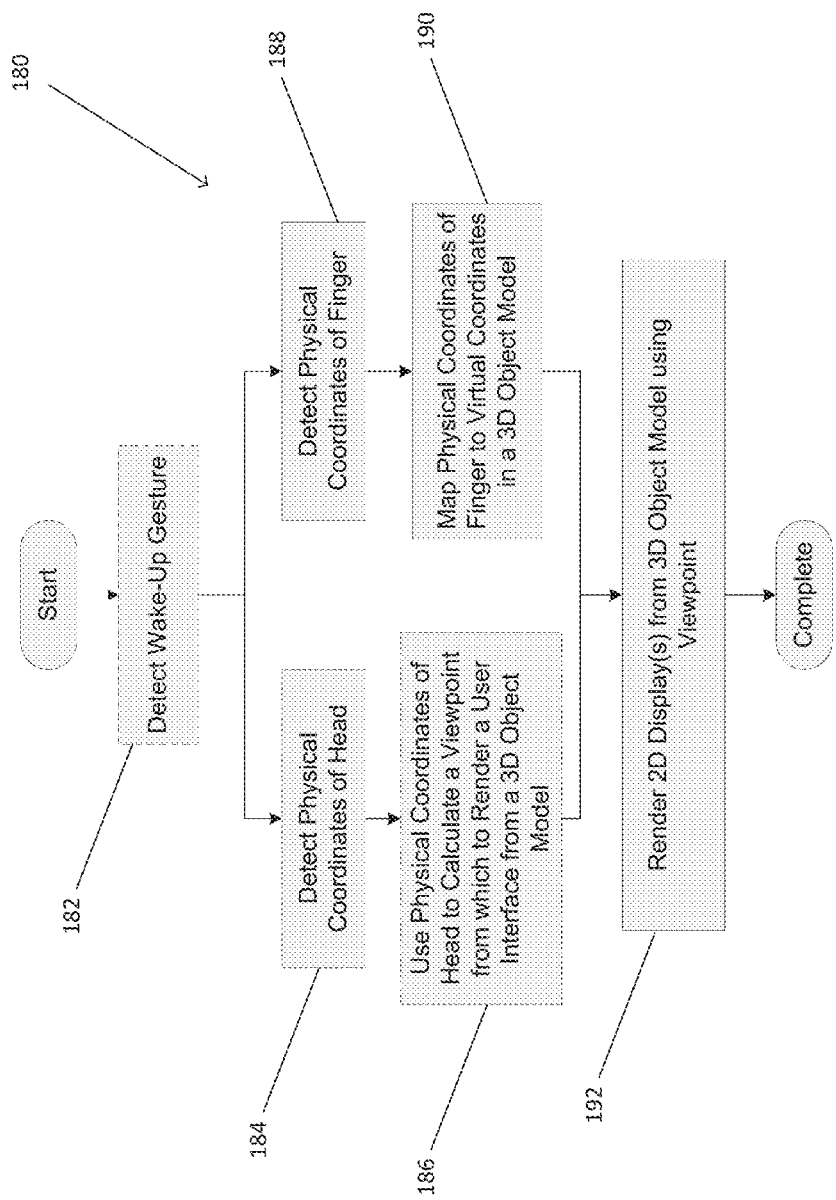
FIG. 11 is a flow chart illustrating a process for rendering a user interface from a 3D object model in a manner that is dependent upon user viewpoint and/or the distance of a cursor user interface object from the foreground of the 3D object model in accordance with an embodiment of the invention.

A process for using gestures to interact with a computing device by tracking the position of at least one finger, mapping the physical coordinates of the tracked object(s) to virtual coordinates for a cursor user interface object within a 3D object model, and rendering a user interface display in a manner that is dependent upon the viewpoint of the user and/or the virtual coordinates of the curser user interface object is illustrated in FIG. 11. The process 180 optionally includes detecting (182) a wake-up gesture, and optionally detecting (184) head position to determine (186) a viewpoint from which to render a user interface based on a 3D object model. The position of a finger (or other appropriate object(s)) is detected (188), and the finger location mapped (190) to a location within a 3D object model. Head position can be detected (184) to determine (186) a viewpoint in embodiments where a user interface display is rendered in a manner that is dependent upon the viewpoint of the user.

The 3D object model can then be utilized to render (192) a user interface display or a stereo pair of user interface displays for 3D visualization. In many embodiments, the rendering process can depend upon the coordinates of the cursor. As noted above, the rendering process can respond to cursor occlusion by increasing the transparency of objects occluding the cursor to give the user the impression of looking through foreground objects. In various embodiments, the cursor size can be increased and/or cursor color altered in conjunction with increasing foreground object transparency to make the cursor more conspicuous to the user. In several embodiments, the rendering process can render user interface display(s) so that user interface objects that are closer to the foreground of the 3D object model than the cursor are not rendered as part of the user interface display (i.e. only the cursor user interface object and objects behind the cursor are rendered). In several embodiments, the rendering process can also scale the user interface objects that are rendered based upon the distance of the coordinates of the cursor user interface object from the foreground of the 3D object model. In a number of embodiments, all user interface objects are rendered and graphical elements are rendered within the user interface display to indicate the location of the cursor including (but not limited to) in the manner described above with reference to FIG. 10C. In other embodiments, any of a variety of rendering processes can be utilized that render a user interface display(s) in a manner that is dependent upon the distance of the cursor user interface object from the foreground (i.e. the position closest to the user) within the 3D object model.

In several embodiments, the manner in which the 3D object model is utilized to render (192) a user interface display is dependent upon the viewpoint of the user. A process similar to any of the processes outlined above for rendering a user interface display in a manner that responds to movement of a user's viewpoint can be utilized as appropriate to the requirements of specific applications in accordance with embodiments of the invention.

Although specific processes are described above with reference to FIG. 11 for rendering a user interface display in a manner that is responsive to the position of a tracked object, the corresponding depth coordinate of a cursor user interface object, and/or viewpoint of a user, any of a variety of processes can be utilized to map detected head and finger movements for use with rendering a user interface display from a 3D object model as appropriate to the requirements of specific applications in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A real-time gesture based interactive system configured to enable gesture based interaction with user interfaces rendered from a 3D object model in a viewpoint dependent manner, comprising:
   a processor;
   a camera system configured to capture image data;
   memory containing:
      an operating system including a 3D object model that describes three dimensional spatial relationships between a set of user interface objects comprising a first user interface object and a second user interface object;
      a head tracking application; and
      an object tracking application;
      wherein the operating system configures the processor to:
         capture image data using the camera system;
         detect first physical coordinates of a user's head by processing at least a portion of the image data using the head tracking application;
         determine a user viewpoint from which to render a user interface display based on the first physical coordinates of the user's head such that a portion of the first user interface object is occluded by the second user interface object in the rendered user interface display;
         determine an object location by processing at least a portion of the captured image data using the object tracking application;
         map the object location to a cursor location comprising three dimensional coordinates;
         render a user interface display from the 3D object model and the cursor location based upon the user viewpoint determined based on the first physical coordinates of the user's head;
         capture additional image data using the camera system;
         detect second physical coordinates of the user's head by processing at least a portion of the additional image data using the head tracking application, the second physical coordinates being different from the first physical coordinates;
         determine an updated user viewpoint from which to render a user interface display based on the second physical coordinates of the user's head, the updated user viewpoint being different from the user viewpoint such that the portion of the first user interface object is not occluded by the second user interface object in the updated user interface display;
         determine an updated object location by processing at least a portion of the additional captured image data using the object tracking application;
         map the updated object location to an updated cursor location comprising three dimensional coordinates; and
         render an updated user interface display from the 3D object model and the updated cursor location based upon the updated user viewpoint determined based on the second physical coordinates of the user's head and the updated object location, where the updated user interface display is rendered to simulate motion parallax based upon depth of the user interface objects and the updated cursor location in the 3D object model.

2. The system of claim 1, wherein the operating system configures the processor to map the object location to a cursor location so that the cursor is not occluded when the processor renders a user interface display.

3. The system of claim 2, wherein the operating system configures the processor to map the object location to a cursor location within the 3D object model, where the cursor location has a predetermined foreground depth.

4. The system of claim 2, wherein the operating system configures the processor to map the object location to a cursor location within an overlay on a user interface display rendered from the 3D object model based upon the user viewpoint.

5. The system of claim 1, wherein the operating system configures the processor to map the object location to a cursor location within the 3D object model.

6. The system of claim 5, wherein the operating system configures the processor to render a user interface display from the 3D object model and the cursor location based upon the user viewpoint so that user interface objects that occlude the cursor location within the 3D object model are rendered to be semi-transparent.

7. The system of claim 5, wherein the operating system configures the processor to render a user interface display from the 3D object model and the cursor location based upon the user viewpoint so that the processor does not render user interface objects that are closer to a foreground of the 3D object model than the cursor location.

8. The system of claim 7, wherein the operating system configures the processor to render a user interface display from the 3D object model and the cursor location based upon the user viewpoint so that user interface objects that are rendered are scaled based upon at least the depth of the cursor location within the 3D object model.

9. The system of claim 5, wherein the operating system configures the processor to render a user interface display from the 3D object model and the cursor location based upon the user viewpoint to include at least one visual indicator of the depth of the cursor location.

10. The system of claim 1, wherein:
    the object tracking application configures the processor to detect the 3D location of a finger within at least a portion of the captured video data; and
    the operating system configures the processor to map the 3D location of a finger to a cursor location within the 3D object model.

11. The system of claim 1, wherein the object tracking application configures the processor to detect pose of a human hand within at least a portion of the captured video data.

12. The system of claim 1, wherein the operating system configures the processor to determine a user viewpoint from which to render a user interface display by using the head tracking application to configure the processor to:
    determine a head pose from at least a portion of the captured image data; and
    map the head pose to a user viewpoint relative to a display device.

13. The system of claim 1, wherein the operating system configures the processor to determine a user viewpoint from which to render a user interface display by using the head tracking application to configure the processor to:
    determine a head pose and a gaze direction from at least a portion of the captured image data; and
    map the head pose and gaze direction to a user viewpoint relative to a display device.

14. The system of claim 1, wherein the operating system further configures the processor to detect a 3D gesture using the object tracking application and to modify the 3D object model in response the detected 3D gesture.

15. The system of claim 14, wherein the 3D gesture is selected from the group consisting of a static 3D gesture and a dynamic 3D gesture.

16. The system of claim 1, wherein the operating system further configures the processor to detect an object location within an interaction zone.

17. The system of claim 1, wherein the camera system comprises at least two cameras.

18. The system of claim 1, wherein the user interface display is rendered from the 3D object model, the cursor location, and the user viewpoint determined based on the first physical coordinates of the user's head such that the cursor is occluded by at least one user interface object of the set of user interface objects in the rendered user interface display, and wherein the updated user interface display is rendered from the 3D object model, the updated cursor location, and the updated user viewpoint determined based on the second physical coordinates of the user's head such that the cursor is not occluded by the at least one user interface object in the updated user interface display.

19. A method for gesture based interaction with a user interfaces rendered from a 3D object model that describes three dimensional spatial relationships between a set of user interface objects comprising a first user interface object and a second user interface object in a viewpoint dependent manner, comprising:

capturing image data using a camera system;

detecting first physical coordinates of a user's head by processing at least a portion of the image data using the processor configured by a head tracking application;

determining a user viewpoint from which to render a user interface display based on the first physical coordinates of the user's head such that a portion of the first user interface object is occluded by the second user interface object;

determining an object location by processing at least a portion of the captured image data using a processor configured by an object tracking application;

mapping the object location to a cursor location using the processor configured by an operating system, the cursor location comprising three dimensional coordinates;

rendering a user interface display from the 3D object model and the cursor location based upon the user viewpoint determined based on the first physical coordinates of the user's head using the processor configured by the operating system;

capturing additional image data using the camera system;

detecting second physical coordinates of the user's head by processing at least a portion of the additional image data using the head tracking application, the second physical coordinates being different from the first physical coordinates;

determining an updated user viewpoint from which to render a user interface display based on the second physical coordinates of the user's head, the updated user viewpoint being different from the user viewpoint such that the portion of the first user interface object is not occluded by the second user interface object;

determining an updated object location by processing at least a portion of the additional captured image data using the processor configured by the object tracking application;

mapping the updated object location to an updated cursor location using the processor configured by the operating system, the updated cursor location comprising three dimensional coordinates; and rendering an updated user interface display from the 3D object model and the updated cursor location based upon the updated user viewpoint determined based on the second physical coordinates of the user's head and the updated object location using the processor configured by the operating system, where the updated user interface display is rendered to simulate motion parallax based upon depth of the user interface objects and the updated cursor location in the 3D object model.

* * * * *